(12) United States Patent
Vassilovski et al.

(10) Patent No.: US 12,408,011 B2
(45) Date of Patent: Sep. 2, 2025

(54) CONDITIONAL VEHICLE TO EVERYTHING (V2X) SENSOR DATA SHARING

(71) Applicant: QUALCOMM Incorporated, San Diego, CA (US)

(72) Inventors: Dan Vassilovski, Del Mar, CA (US); Libin Liu, Monterey Park, CA (US); Shailesh Patil, San Diego, CA (US); Gene Wesley Marsh, San Diego, CA (US); Anshuman Saxena, San Diego, CA (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 17/664,159

(22) Filed: May 19, 2022

(65) Prior Publication Data
US 2023/0379673 A1 Nov. 23, 2023

(51) Int. Cl.
| | | |
|---|---|---|
| *H04W 4/38* | (2018.01) | |
| *G01S 5/00* | (2006.01) | |
| *H04W 4/40* | (2018.01) | |
| *H04W 92/18* | (2009.01) | |

(52) U.S. Cl.
CPC ............. *H04W 4/38* (2018.02); *G01S 5/0072* (2013.01); *H04W 4/40* (2018.02); *H04W 92/18* (2013.01)

(58) Field of Classification Search
CPC .......... H04W 4/38; H04W 4/40; H04W 92/18
See application file for complete search history.

(56) References Cited

U.S. PATENT DOCUMENTS

| | | | |
|---|---|---|---|
| 2016/0006122 A1* | 1/2016 | Seol .................... | H01Q 3/30 342/372 |
| 2017/0113664 A1* | 4/2017 | Nix ...................... | G07C 5/0891 |
| 2021/0045070 A1* | 2/2021 | Yi ........................ | H04W 76/27 |
| 2021/0250118 A1* | 8/2021 | Roth-Mandutz ...... | H04W 72/56 |

* cited by examiner

*Primary Examiner* — Jamal Javaid
(74) *Attorney, Agent, or Firm* — Patterson + Sheridan, L.L.P.

(57) ABSTRACT

Certain aspects of the present disclosure provide techniques for techniques for sensor data sharing. Certain aspects provide a method for wireless communication by a first wireless device. The method generally includes receiving, from one or more sensors, corresponding one or more raw sensor data sets and transmitting, to a second wireless device, at least one message comprising information regarding an object detected based on processing the one or more raw sensor data sets, wherein the information includes one or more characteristics of the object derived based on processing the one or more raw sensor data sets, wherein: when one or more conditions are met, the information further includes at least one raw sensor data set of the one or more raw sensor data sets; and when the one or more conditions are not met, the information does not include any raw sensor data.

26 Claims, 14 Drawing Sheets

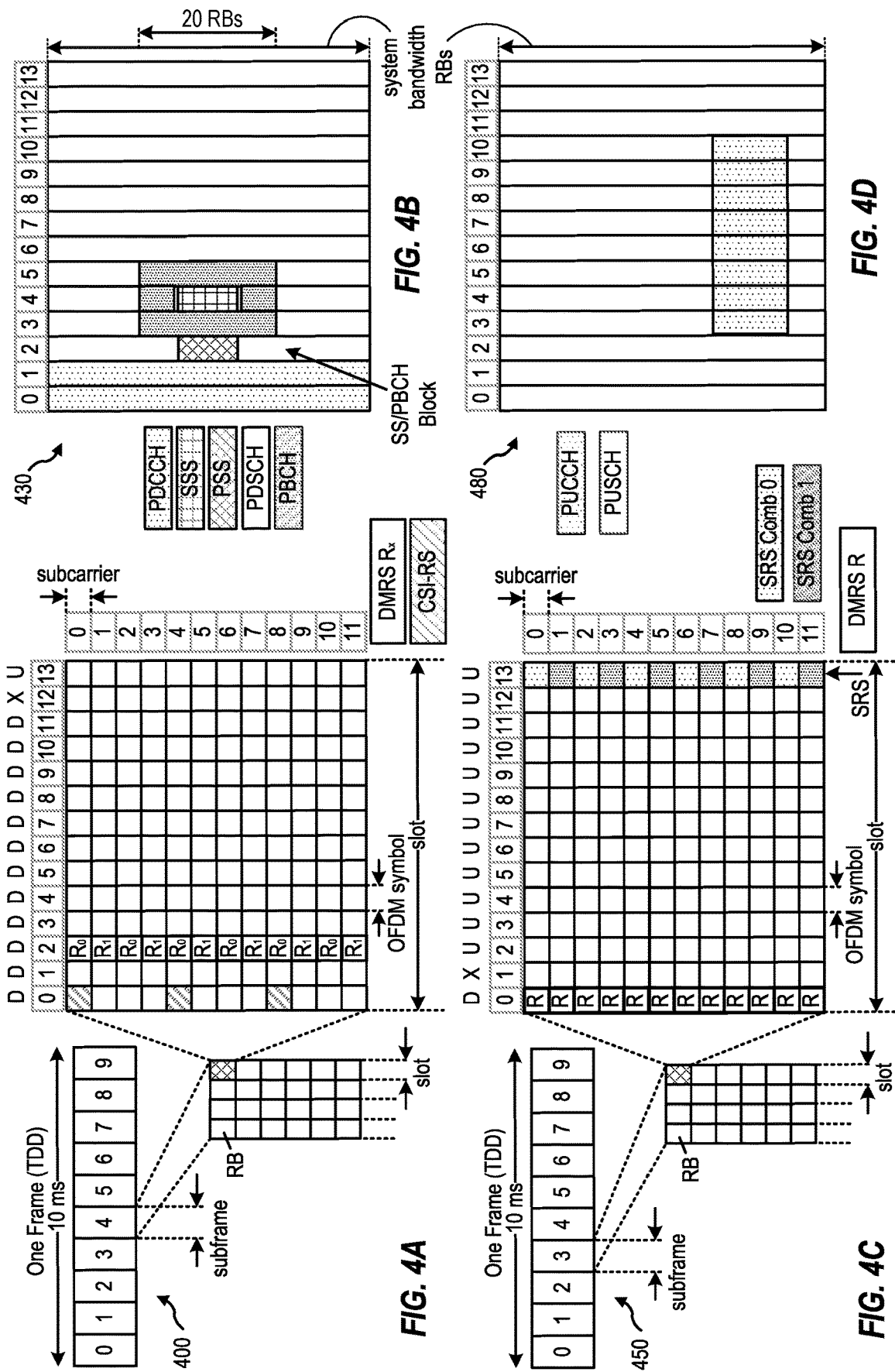

CONDITIONAL VEHICLE TO EVERYTHING (V2X) SENSOR DATA SHARING

BACKGROUND

Field of the Disclosure

Aspects of the present disclosure relate to wireless communications, and more particularly, to techniques for sensor data sharing.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a first wireless device. The method includes receiving, from one or more sensors, corresponding one or more raw sensor data sets; and transmitting, to a second wireless device, at least one message comprising information regarding an object detected based on processing the one or more raw sensor data sets, wherein the information includes one or more characteristics of the object derived based on processing the one or more raw sensor data sets, wherein: when one or more conditions are met, the information further includes at least one raw sensor data set of the one or more raw sensor data sets; and when the one or more conditions are not met, the information does not include any raw sensor data.

Another aspect provides a method of wireless communications by a first wireless device. The method includes receiving, from a second wireless device, at least one message comprising information regarding an object detected by the second wireless device, wherein the information includes one or more characteristics of the object, wherein: when one or more conditions are met, the information further includes at least one raw sensor data set of one or more raw sensor data sets associated with one or more sensors of the second wireless device; and when the one or more conditions are not met, the information does not include any raw sensor data; and identifying the object at least based on the information.

Another aspect provides a method of wireless communications by a first wireless device. The method includes selecting one or more conditions for including, in at least one message, raw sensor data corresponding to a detected object; and transmitting, to a second wireless device, signaling configuring the second wireless device with the one or more conditions.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Figure 1:
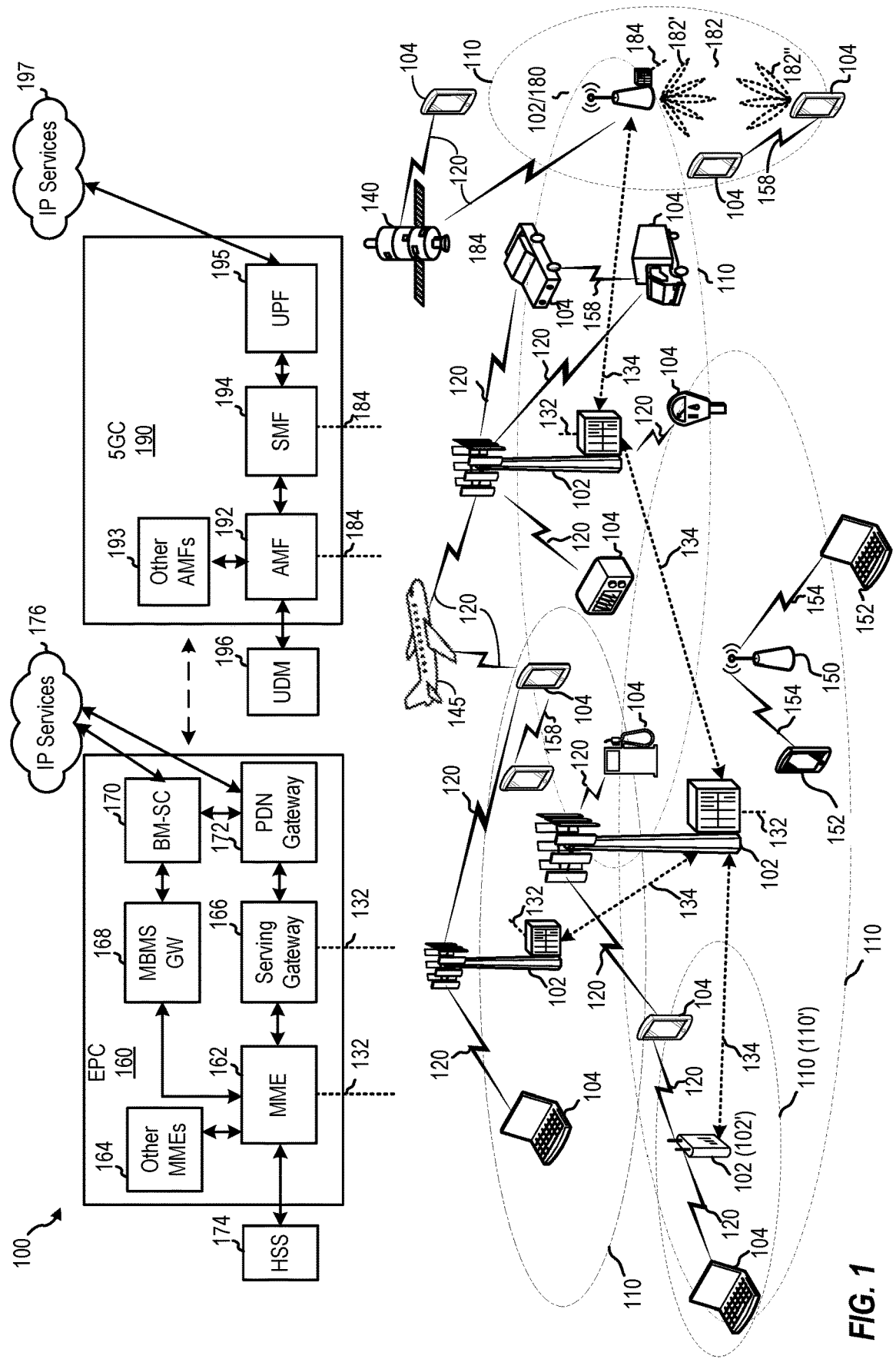
FIG. 1 depicts an example wireless communications network.

Aspects of the present disclosure provide apparatuses, methods, processing systems, and computer-readable mediums for conditional sensor data sharing via vehicle to everything (V2X) communication. For example, cooperative perception, also known as cooperative sensing, collective perception, or sensor sharing, enables vehicles (e.g., mobile intelligent transportation system (ITS) stations) and infrastructure nodes (e.g., fixed ITS stations) to share their locally perceived data with others by means of V2X communication. The sharing of such data between ITS stations (e.g., and cloud-based entities) may be accomplished by exchanging sensor sharing messages, application-layer messages, or lower-layer messages including information regarding objects perceived (e.g. vehicles, pedestrians, obstacles, etc.) in an environment. The sensor sharing messages may contain characteristics (e.g., abstractions) about a particular object and may be directed to an ITS station or broadcast for ITS stations in the vicinity, thereby allowing a receiving ITS station to determine a location of the perceived object. The ITS station may determine, for example a location and/or other characteristics (e.g., velocity, speed, size, etc.), of the perceived object based, at least, on the information in the received sensor sharing message. It should be noted that though certain aspects are described with respect to ITS stations and V2X communication, the techniques are similarly applicable to other suitable devices and/or types of communication.

By receiving perception information from one or more ITS stations, mobile ITS stations (e.g., vehicles) may detect objects in an environment more efficiently, and in some cases more accurately to, at least, avoid safety-critical situations. Further, by collecting information from multiple mobile ITS stations, fixed ITS stations (e.g., such as roadside units (RSUs)) may form a more accurate picture of an environment (e.g., a driving environment) in order to improve the situational awareness of mobile ITS stations. Similarly, cloud-based entities may aggregate input from mobile and fixed ITS stations in order to provide information about the environment, such as driving instructions and/or alerts to mobile ITS stations.

In some cases, however, a receiving ITS station (e.g., an ITS station receiving a sensor sharing, application-layer, or lower-layer message) or cloud-based entity may not be able to accurately interpret the reported object in the environment based on the characteristics provided in the sensor sharing message. Accordingly, ancillary data, such as raw sensor data from a camera, radar, lidar, or other sensor at a transmitting ITS station (e.g., an ITS station transmitting the sensor sharing, application-layer, or lower-layer message) used to detect the reported object, may be used by the receiving ITS station or cloud-based entity to accurately localize the reported object. The ability of a transmitting ITS station to provide such ancillary data, however, may be limited by available bandwidth and/or the availability of over-the-air resources.

As used herein, raw sensor data refers to data obtained from a sensor prior to extraction of one or more characteristics (e.g., object abstractions such as length, width, height, location, speed, etc.). Accordingly, in certain aspects, raw sensor data, as used herein, may include data obtained from a sensor that has been minimally processed. For example, raw data, as used herein, may include video streams processed to a particular frame rate (e.g., an MPEG format) and images processed to a particular resolution.

Accordingly, aspects described herein provide mechanisms for determining when a transmitting ITS station, from which a sensor sharing message regarding a detected object originated, is to include ancillary data (e.g., non-abstracted, raw sensor data) associated with the detected object in the same or another sensor sharing message. In particular, techniques described herein may seek to preserve bandwidth and/or over-the-air resources by configuring a transmitting ITS station to transmit such ancillary data for certain occasions, and not for certain other occasions. In other words, while in some situations (e.g., situations where one or more conditions are met) transmission of such ancillary data may occur, in other situations transmission of such ancillary data may not occur, for example, to preserve available bandwidth and resources.

According to aspects described herein, the one or more conditions may be related to at least one of a configuration received at a transmitting ITS station, a request received at a transmitting ITS station, noise present in the raw sensor data, climate conditions of the environment when an object is detected, a confidence level in the accuracy of a detected object, a type of the object detected, a type of the transmitting and/or receiving ITS stations, a channel condition, a type of the environment where an object is detected, and/or the like.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
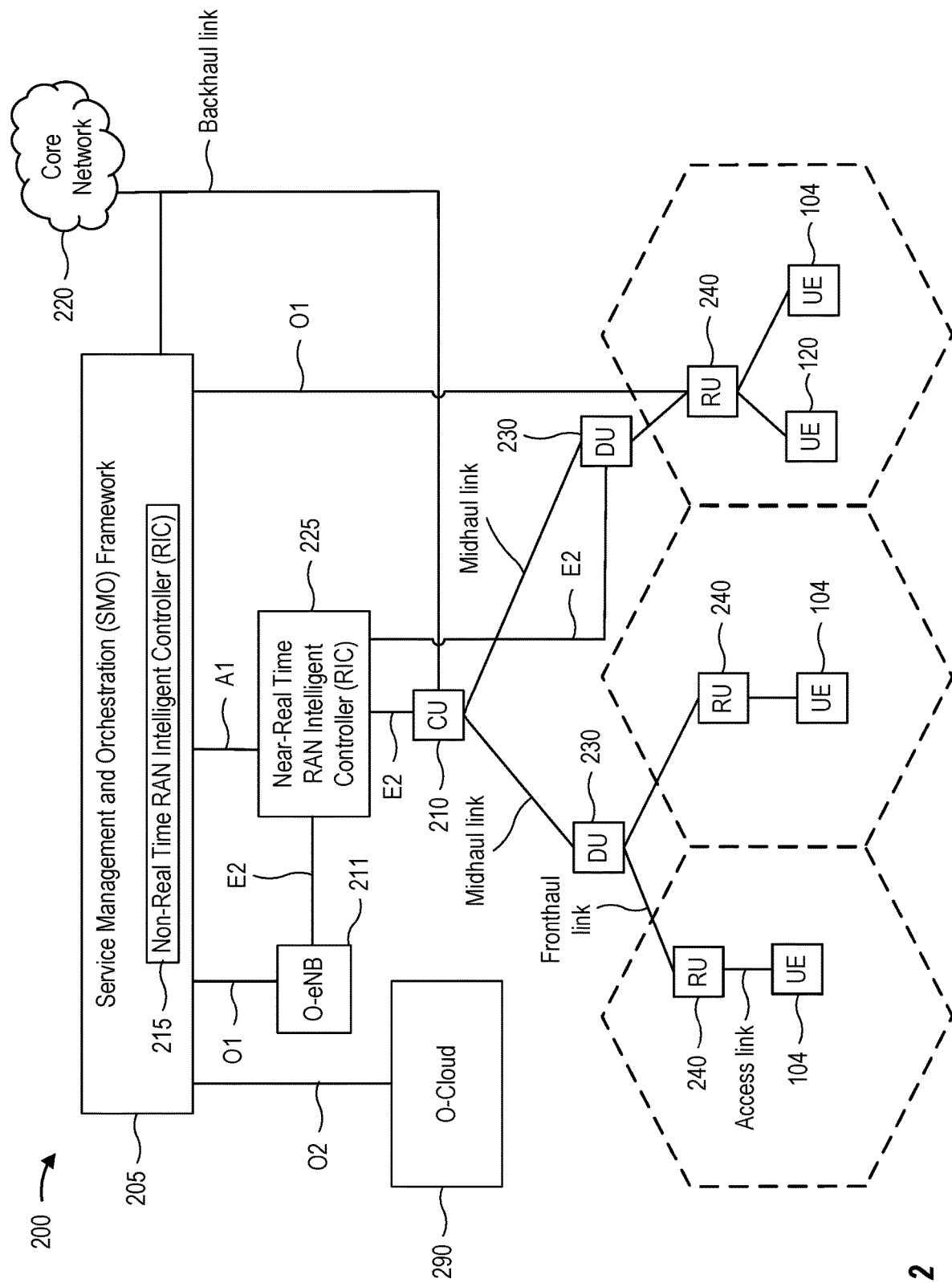
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz — 7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A BS configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium.

Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit—User Plane (CU-UP)), control plane functionality (e.g., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an Al interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
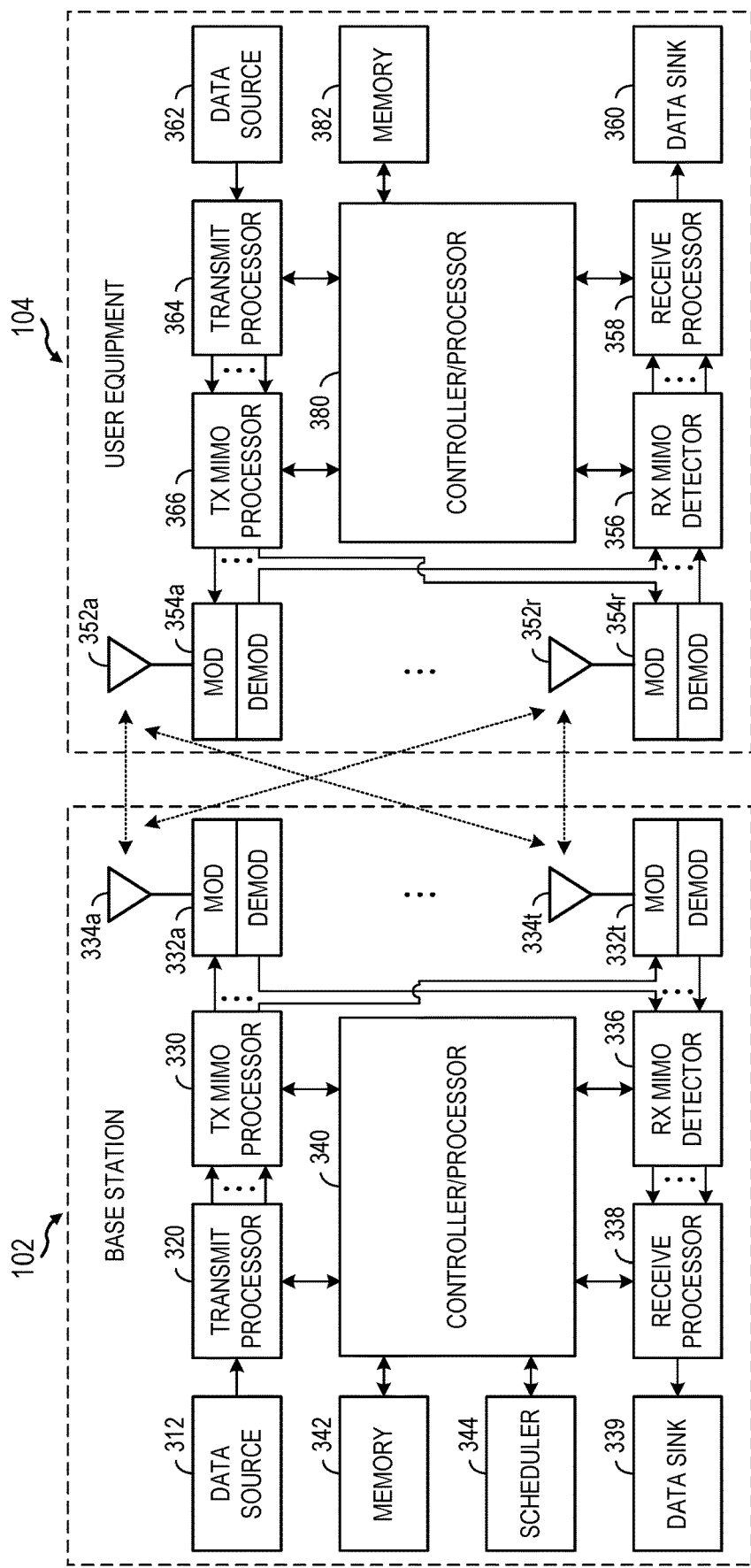
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Vehicle to Everything (V2X) Communication

While communication between user equipments (UEs) (e.g., UE 104 of FIG. 1) and BSs (e.g., BS 102 of FIG. 1) may be referred to as the access link, and the access link may be provided via a cellular interface (e.g., Uu interface), communication between devices may be referred to as the sidelink.

In some examples, two or more subordinate entities (e.g., UEs 104) may communicate with each other using sidelink signals. Real-world applications of such sidelink communications may include public safety, proximity services, UE-to-network relaying, vehicle-to-vehicle (V2V) communications, Internet of Everything (IoE) communications, Internet of Things (IoT) communications, mission-critical mesh, and/or various other suitable applications. Generally, a sidelink signal may refer to a signal communicated from one subordinate entity (e.g., UE 104 illustrated in FIG. 1) to another subordinate entity (e.g., another UE 104 illustrated in FIG. 1) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figures 5A, 5B:
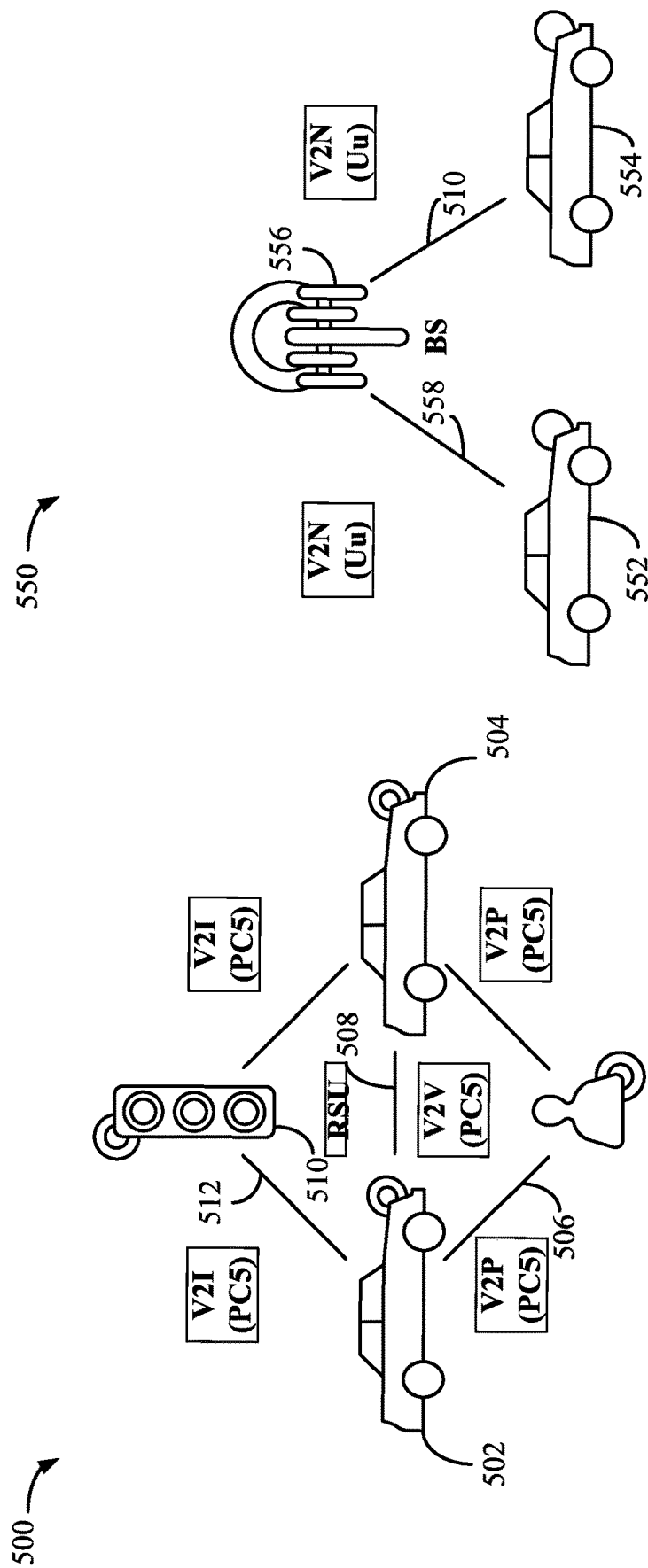
FIGS. 5A and 5B show diagrammatic representations of example vehicle to everything (V2X) systems.

FIGS. 5A and 5B show diagrammatic representations of example vehicle to everything (V2X) systems in accordance with some aspects of the present disclosure. For example, the vehicles shown in FIGS. 5A and 5B may communicate via sidelink channels and may perform sidelink CSI reporting as described herein.

The V2X systems, provided in FIGS. 5A and 5B provide two complementary transmission modes. A first transmission mode, shown by way of example in FIG. 5A, involves direct communications (for example, also referred to as side link communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle-to-vehicle (V2V) communications) is illustrated with two vehicles 502, 504. The first transmission mode allows for direct communication between different participants in a given geographic location. As illustrated, a vehicle can have a wireless communication link 506 with an individual (i.e., vehicle to person (V2P), for example, via a UE) through a PC5 interface. Communications between the vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V2I)) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a base station (for example, an eNB or gNB), that sends and receives information to and from (for example, relays information between) vehicles 552, 554. The network communications through vehicle to network (V2N) links 558 and 510 may be used, for example, for long-range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

According to previously known techniques, resource allocation is reservation based in NR sidelink communications. In these techniques, resource allocations are made in units of sub-channels in the frequency domain and are limited to one slot in the time domain. In the previously known techniques, a transmission may reserve resources in the current slot and in up to two future slots. Reservation information may be carried in sidelink control information (SCI). In the previously known techniques, SCI may be transmitted in two stages. A first stage SCI (SCI-1) may be transmitted on a PSCCH and contains resource reservation information as well as information needed to decode a second stage SCI (SCI-2). A SCI-2 may be transmitted on the PSSCH and contains information needed to decode data on the shared channel and to provide feedback (e.g., acknowledgments (ACKs) or negative acknowledgments (NACKs)) over the PSFCH.

Figure 6A:
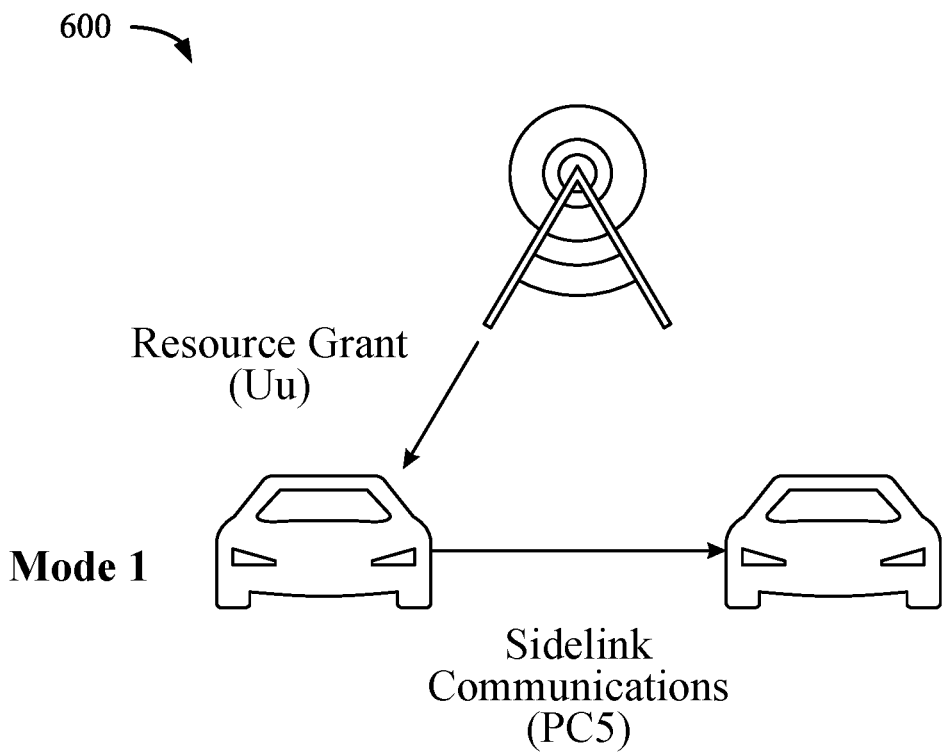
FIGS. 6A and 6B illustrate two modes, respectively, of resource allocation for sidelink communications.
Figure 6B:
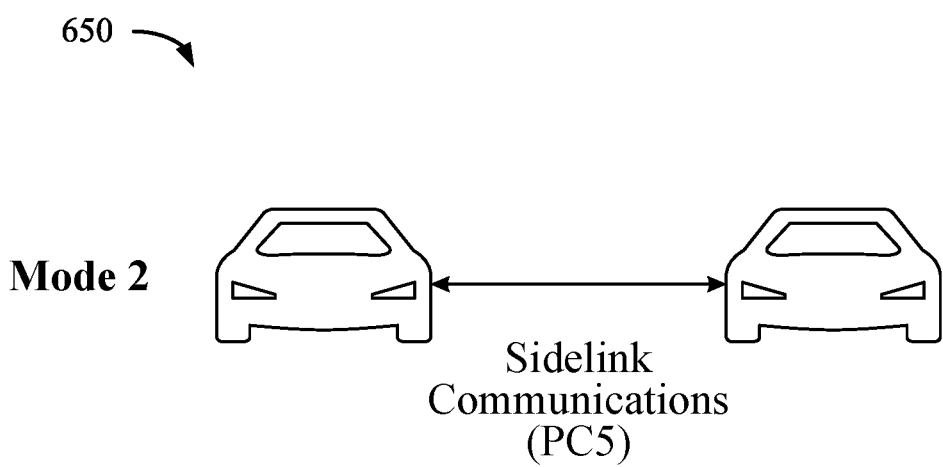

FIGS. 6A and 6B illustrate two modes 600, 650, respectively, of resource allocation for sidelink communications, Mode 1 and Mode 2. Mode 1 and Mode 2 are briefly mentioned in FIGS. 5A and 5B and are further discussed with respect to FIG. 6.

In Mode 1 sidelink communication, the sidelink resources are often scheduled by a gNB. In Mode 2 sidelink communication, a UE may autonomously select sidelink resources from a (pre)configured sidelink resource pool(s) based on the channel sensing mechanism. When the UE is in-coverage, a gNB may be configured to adopt Mode 1 or Mode 2. When the UE is out of coverage, only Mode 2 may be adopted.

In Mode 2, when traffic arrives at a transmitting UE, the transmitting UE may select resources for PSCCH and PSSCH, and/or reserve resources for retransmissions to minimize latency. Therefore, in conventional configurations the transmitting UE may select resources for PSSCH associated with PSCCH for initial transmission and blind retransmissions, which incurs unnecessary resources and the related power consumption. To avoid such resource waste and other similar resource duplication/blind reservation/redundancy, the UEs in sidelink communication may communicate to use a subset of the resources.

Example Vehicle to Everything (V2X) Sensor-Sharing

Autonomous vehicles (AVs) have received extensive attention in recent years as a rapidly emerging technology to improve safety and efficiency of current road transportation systems. Most of the existing and under development AVs rely on local sensors, such as cameras, lidars, and radars, to perceive the environment. Despite significant advances in sensor technology in recent years, the perception capability of these local sensors have limitations that may degrade the performance of automated vehicles. For example, in adverse weather conditions (such as rain, snow, and/or fog), the AV's cameras may not be able to adequately capture the environment, and in situations where the sensor's field of vision is blocked (by other vehicles or buildings) such sensors may not be able to detect beyond the position of the obstacle. To overcome these limitations and improve the perception capabilities of the vehicles, cooperative perception enables the wireless exchange of sensor information between vehicles and between vehicles and infrastructure nodes.

Cooperative perception (CP), also known as cooperative sensing, collective perception, or sensor sharing, enables vehicles and infrastructure nodes (e.g., mobile and fixed intelligent transportation system (ITS) stations) to detect objects (e.g. connected vehicles, non-connected vehicles, pedestrians, obstacles, etc.) beyond their local sensing capabilities. In particular, cooperative perception enables an ITS station to share its local perception information with others by means of vehicle to everything (V2X) communication, thereby achieving improved efficiency and safety in road transportation.

Major standardization organizations such as European Telecommunications Standard Institute (ETSI), Society of Automotive Engineers (SAE), China SAE (CSAE), and Institute of Electrical and Electronics Engineers (IEEE) have made a significant effort to standardize specifications regarding C-ITS services, V2X communication protocols, and security. While ITS focuses on digital technologies providing intelligence placed at the roadside or in vehicles, C-ITS focuses on the communication between those systems—whether it is a vehicle communicating with another vehicle, with the infrastructure, or with other C-ITS systems. The collective perception service is just one C-ITS service that is currently being standardized.

The CP service enables an ITS station to share its perception information with adjacent ITS stations by exchanging sensor sharing messages (e.g., referred to as sensor sharing message (SSMs), collective perception messages (CPMs), and/or sensor data sharing messages (SDSMs)) via V2X communication. By collecting information from multiple mobile ITS stations, such as vehicles, fixed ITS stations, such as RSUs, may form a more accurate picture of a driving environment in order to improve the situational awareness of such vehicles. Similarly, cloud-based entities may aggregate input from vehicles and RSUs in order to provide driving instructions and alerts to vehicles.

Such sensor sharing messages may convey abstract representations of perceived objects instead of raw sensor data, facilitating the interoperability between ITS stations of different types and from different manufactures. For example, sensor sharing messages may contain position, motion state, and/or classification information about a particular object and may be directed to a receiving ITS station, thereby allowing the receiving ITS station to predict, calculate, and avoid safety-critical situations. However, in some cases, inclusion of additional information, such as the non-abstracted data (also referred to herein as "ancillary data" and "raw sensor data" from a camera, radar, lidar, or other sensor), may be helpful for a receiver of the sensor sharing message to accurately interpret the reported object in the environment.

Figure 7:
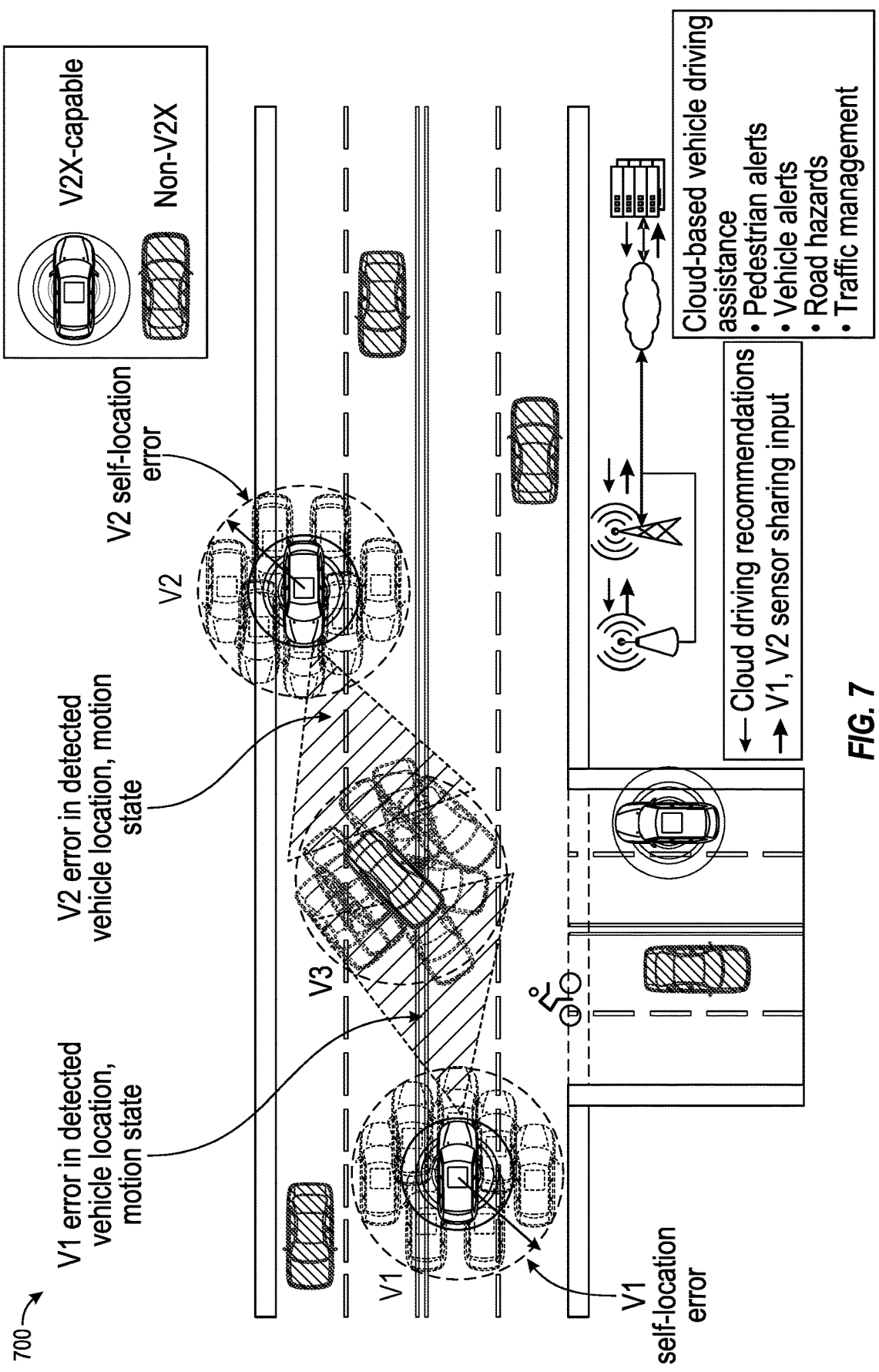
FIG. 7 illustrates an example case where raw sensor data may be used for object detection by an intelligent transportation system (ITS) station.

FIG. 7 illustrates an example case 700 where raw sensor data may be helpful for object detection by an ITS station. As shown in FIG. 7, two ITS stations, specifically a first vehicle (V1) and a second vehicle (V2), may be capable of V2X communication (e.g., capable of sidelink communication with other vehicles, RSUs, etc.). Each of V1 and V2 may be equipped with one or more sensors (e.g., camera, radar, lidar, etc.) to perceive the environment in which they are situated. In particular, in example case 700, V1 and V2 may use their corresponding one or more sensors to detect a third vehicle (V3). V3 may be a non-V2X vehicle meaning V3 may not exchange data with other vehicles, RSUs, and/or pedestrians in the environment.

V1 may detect V3 and seek to share information of this detected vehicle with V2. In other words, V1 may process raw data received from sensor(s) on V1 to detect V3 and transmit a message, to V2, including information about V3. The message may contain information regarding a position, a motion state, and/or classification information associated with V3. The message may not include the non-abstracted, raw data used to detect V3.

V2 may also detect V3 via sensor(s) on V2. In other words, V2 may process raw data received from sensor(s) on V2 to detect V3. Additionally, V2 may receive, from V1, the message containing information about V3. Using its own data, in addition to the information received from V1, V2 may attempt to identify or localize a location of V3 in the environment. In certain cases, an ability of V2 to localize V3 may be based on (1) an accuracy of V2 in detecting its own position in relation to V3 and (2) an accuracy of V1 in detecting is own position in relation to V3.

In particular, positioning refers to the extraction of a vehicle's absolute and relative positions concerning other objects such as building, pedestrians, traffic signs, and other vehicles. Position accuracy describes the closeness of a measured position of each vehicle to its true position value. Per example case 700 illustrated in FIG. 7, each of V1 and V2 may have some inherent uncertainty in their position (e.g., shown as duplicate images of each vehicle in FIG. 7) due to a number of factors (e.g., due to the fact that each vehicle is moving, due to a limited number of satellites in the vicinity, etc.). Accordingly, such positioning inaccuracy, also referred to as "self-location error," of each of V1 and V2 may cause discrepancies between V1's perception of V3 and V2's perception of V3. For example, in example case 700, the self-location errors of each of V1 and V2 may cause V2 to be unable to determine that V3 detected by V1 and reported to V2 is, in fact, the same vehicle, V3, detected by V2. The same may be true where, V2 transmits a message to V1 regarding V3, and V1 uses its own sensor data and the message from V2 to localize V3.

Further, in some cases, V1 and V2 may each transmit a message to a third party (e.g., a cloud-based entity) regarding the detection of V3. Given ambiguities in each of these messages transmitted by V1 and V2 (e.g., due to positioning inaccuracy of V1 and V2), the third party may be unable to determine that V3 reported by V1 is the same vehicle, V3, reported by V2.

For the foregoing reasons, in some cases, it may be beneficial to provide additional information, such as the non-abstracted, raw data processed to detect V3, in such sensor sharing messages. The additional information may help a receiving ITS station to better predict and localize a location of V3 in the environment, to, at least, avoid safety-critical situations. The ability to provide such ancillary data, however, may be limited by available bandwidth and/or the availability of over-the-air resources.

As an illustrative example, at a busy intersection, every V2X capable vehicle and/or pedestrian with a cell phone may be capable of communicating information about detected objects in the vicinity. As such, each of these vehicles and devices may transmit one or more messages regarding objects detected based on processing raw sensor data. To allow each of these vehicles and devices to transmit not only abstract representations of perceived objects, but also raw sensor data processed to detect such objects, may not be feasible given available bandwidth and/or over-the-air resources. In other words, the network may not be able to support such a level of data transmission.

Aspects Related to Efficient Utilization of Over-the-Air Resources for Vehicle to Everything (V2X) Sensor Sharing Aspects of the present disclosure provide a conditional approach for sensor data sharing via vehicle to everything (V2X) communication. In particular, aspects described herein provide mechanisms for determining when an originator of a sensor sharing message regarding a detected object is to include ancillary data (e.g., non-abstracted, raw sensor data) associated with the detected object in the same or another sensor sharing message. In certain aspects, an originator intelligent transportation system (ITS) station may include such ancillary data in response to a request from a receiving ITS station receiving the sensor sharing message. In certain aspects, the originator ITS station may include such ancillary data based on signaling, from a network entity (e.g., a base station (BS), a roadside unit (RSU), etc.) configuring the originator ITS station to include ancillary data when exchanging sensor sharing messages. In certain aspects, the originator ITS station may include such ancillary data when one or more conditions are satisfied. As described in more detail below, a network entity may select the one or more conditions and configure the originator with such conditions.

In certain aspects, ancillary data may help a receiver of a sensor data sharing message (e.g., a receiving ITS station) to more accurately detect objects in an environment. Enabling a receiver to more accurately detect such objects may help to improve safety and efficiency of current road transportation systems. However, where resources are unavailable, communicating such ancillary data may not be feasible. Accordingly, in certain aspects, techniques described herein may preserve bandwidth and/or over-the-air resources by configuring an originator to transmit such ancillary data based on certain conditions. In other words, while in some situations (e.g., situations where one or more conditions are met) an ITS station may be configured to transmit such ancillary data, in other situations the ITS station may not be configured to transmit such ancillary data, for example, to preserve available bandwidth and resources.

In certain aspects, the ancillary data may also help a receiver to more accurately determine its position. In particular, in some cases, the receiver may use the ancillary data to more accurately detect its own position for more accurate objection detection. In other words, the ancillary data may be used by a receiver to rectify errors when estimating its position. For example, a vehicle may know its sensors have some inherent error when detecting objects. However, based on receiving sensor data sharing messages including raw sensor data over time, the vehicle may be able to determine and account for the error when subsequently detecting objects in the environment.

Figure 8:
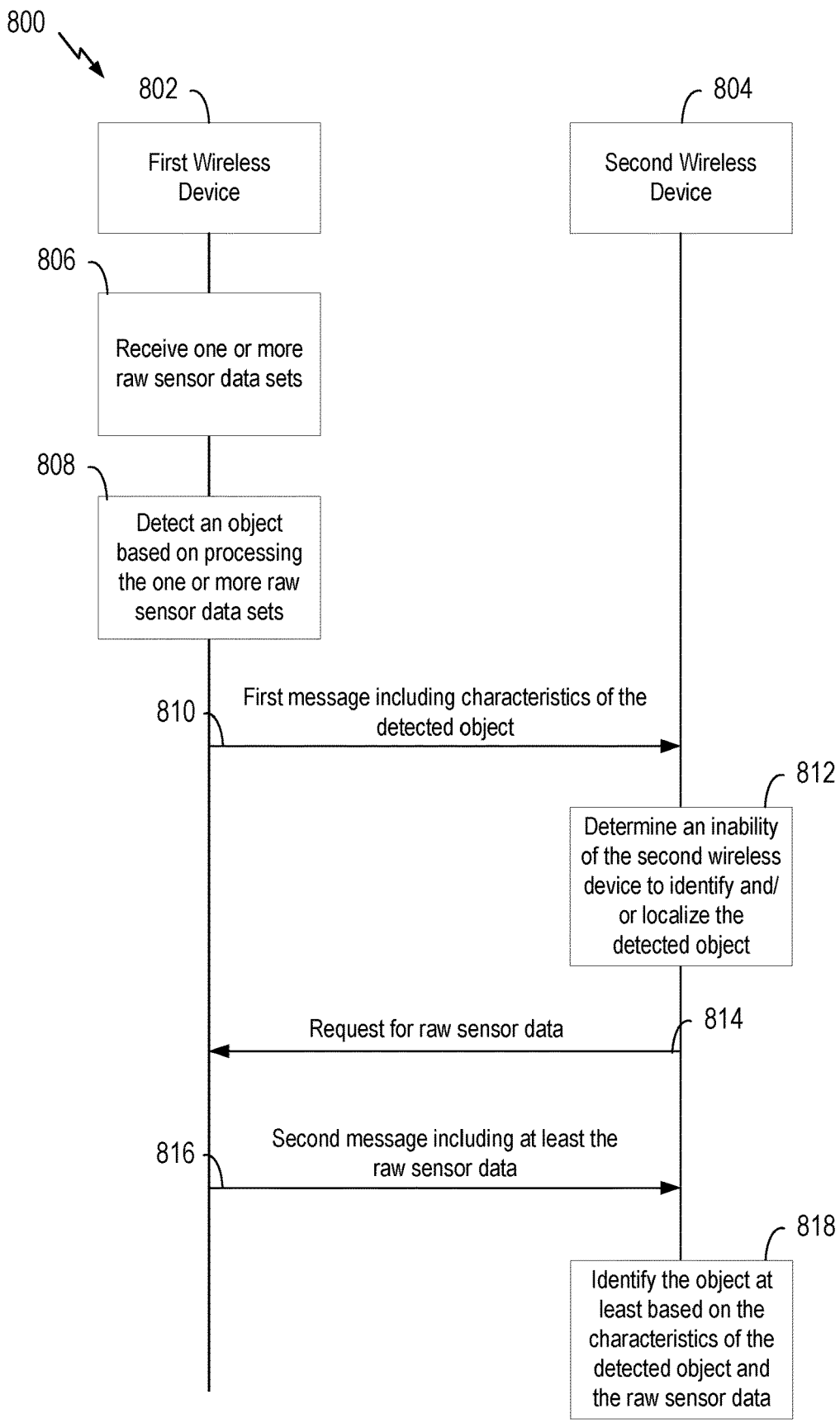
FIG. 8 is a call flow diagram illustrating example signaling for transmitting ancillary data associated with a detected object based on a received request.

FIG. 8 is a call flow diagram 800 illustrating example signaling for transmitting ancillary data associated with a detected object based on a received request. As shown in FIG. 8, two ITS stations, specifically a first wireless device 802 and a second wireless device 804, may be capable of V2X communication (e.g., capable of sidelink communication with each other, other vehicles, other RSUs, etc.). First wireless device 802 may be equipped with one or more sensors (e.g., camera, radar, lidar, etc.) to detect objects in an environment where first wireless device 802 and second wireless device 804 are situated. Similarly, second wireless device 804 may also be equipped with one or more sensors (e.g., camera, radar, lidar, etc.) to detect objects in the environment.

At 806, first wireless device 802 receives, from one or more sensors at first wireless device 802, corresponding one or more raw sensor data sets. At 808, first wireless device 802 detects an object based on processing the one or more raw sensor data sets.

At 810, first wireless device 802 transmits a first message including characteristics of the detected object. In other words, the first message may include an abstract representation of the detected object instead of raw sensor data. For example, the first message may include characteristics of the detected object such as, at least one of, a location of the detected object, a motion state of the detected object, an indication of the detected object's type (e.g., a vehicle, a bicycle, a pedestrian, etc.), or the like. Non-abstracted, raw sensor data may not be included in the first message. The first message may be an application-layer message, a radio resource control (RRC) message, a sidelink application layer message, or a sidelink signaling message.

At 812, second wireless device 804 determines that second wireless device 804 is unable to identify and/or localize the detected object. Accordingly, second wireless device 804 determines raw sensor data is needed for second wireless device 804 to accurately interpret the reported object in the environment.

Based on this determination, at 814, second wireless device 804 transmits a request, to first wireless device 802, for the raw sensor data. The request may include at least one of an indication of the object (e.g., a characteristic of the object) or a type of raw sensor data requested. The type of raw sensor data requested may include at least one of image data, radar data, lidar data, or data from one or more other types of sensors at first wireless device 802. In certain aspects, prior to transmitting the request, second wireless device 804 may determine whether second wireless device 804 has sufficient computational capability to process raw sensor data. Thus, the request for raw sensor data may be transmitted where second wireless device 804 determines second wireless device 804 has sufficient computation capability to process the requested raw sensor data.

In response to the request, at 816, first wireless device 802 transmits a second message to second wireless device 804 including, at least, the requested raw sensor data. At 818, second wireless device 804 identifies the object at least based on the characteristics of the detected object and the raw sensor data.

Example signaling illustrated in call flow diagram 800 may be understood with reference to example case 700 illustrated in FIG. 7. In particular, first wireless device 802 and second wireless device 804 illustrated in FIG. 8 may, in certain aspects, correspond to V1 and V2, respectively, illustrated in FIG. 7.

Accordingly, at 806, V1 may receive one or more raw sensor data sets, for example camera images, from a camera sensor at V1. At 808, V1 processes the camera images to detect V3 in the environment. As mentioned, V3 is a non-V2X vehicle meaning V3 may not exchange data with other vehicles (including V1 and V2), RSUs, and/or pedestrians in the environment.

At 810, V1 transmits, to V2, a first message including characteristics of V3. In other words, the first message may include at least a location of V3, a motion state of V3 (e.g., stopped, moving, turning, etc.), and/or an indication that V3 is a vehicle, or more specifically, a particular type of vehicle, such as a police car. The first message may not include the original camera images which were processed by V1 to detect V3.

At 812, V2 uses the information included in the first message to attempt to locate V3 in the environment. In other words, V2 uses the information included in the first message in addition to one or more raw sensor data sets received from one or more sensors at V2, a map, and/or other information previously provided to V2 to attempt to locate V3 in the environment. In some cases, at 812, V2 determines that V2 is unable to identify and/or localize V3. For example, V2 may process the one or more raw sensor data sets received from one or more sensors at V2, the map, and/or other information previously provided to V2 to detect V3. However, after receiving the first message from V1, V2 may unable to determine whether or not V3 detected by V1 and reported to V2 is, in fact, the same vehicle, V3, detected by V2. As mentioned, the inability of V2 to localize V3 may be due to (1) poor positioning accuracy of V2 in detecting its own position in relation to V3 and/or (2) poor positioning accuracy of V1 in detecting is own position in relation to V3. Accordingly, V2 may determine that ancillary data is needed, from V1, for V2 to accurately interpret the reported object (e.g., V3) in the environment.

Based on this determination, at 814, V2 transmits a request, to V1, for such ancillary data. In this example, the ancillary data may be the camera images processed by V1 to detect V3. In response to the request, at 816, V1 transmits a second message to V2 including, at least, the camera images. The second message may be an application-layer message, an RRC message, a sidelink application layer message, or a sidelink signaling message. At 818, V2 identifies V3 in the environment at least based on the reported characteristics of V3 and the camera images provided to V2.

Figure 9:
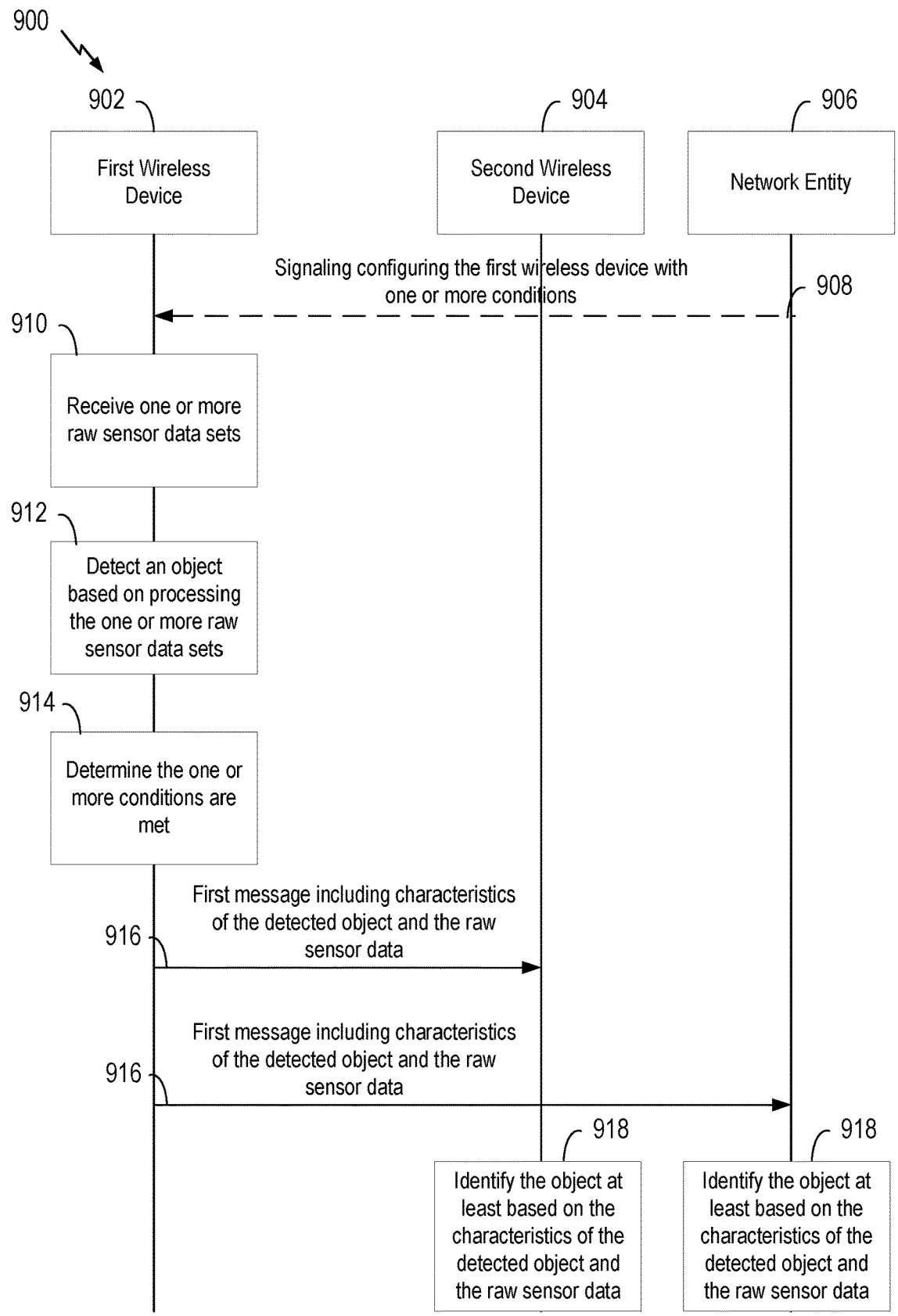
FIG. 9 is a call flow diagram illustrating example signaling for transmitting ancillary data associated with a detected object based on one or more conditions.

While FIG. 8 illustrates a case where ancillary data is included in a sensor sharing message in response to a request from a receiving ITS station, in certain other aspects, such ancillary data may be included in a sensor sharing message when one or more other conditions (e.g., conditions beyond receiving a request from a receiving ITS station) are satisfied. FIG. 9 is a call flow diagram 900 illustrating example signaling for transmitting ancillary data associated with a detected object based on one or more conditions.

As shown in FIG. 9, two ITS stations, specifically a first wireless device 902 and a second wireless device 904, may be capable of V2X communication (e.g., capable of sidelink communication with each other, other vehicles, other RSUs, etc.). First wireless device 902 and second wireless device 904 may both be equipped with one or more sensors (e.g., camera, radar, lidar, etc.) to detect objects in an environment where first wireless device 902 and second wireless device 904 are situated. Further, first wireless device 902 and second wireless deice 904 may communicate with a network entity 906 (e.g., a BS, an RSU, etc.) via a Uu interface or a sidelink PC5 interface.

Similar to 806 and 808 illustrated in FIG. 8, in FIG. 9, at 910, first wireless device 902 receives, from one or more sensors at first wireless device 902, corresponding one or more raw sensor data sets, and at 912, detects an object based on processing the one or more raw sensor data sets.

Unlike FIG. 8 where first wireless device 802 transmits the first message including characteristics of the detected object (e.g., without including non-abstracted, raw sensor data) after detecting the object, in FIG. 9, first wireless device 902 may determine whether one or more conditions are met prior to sending a sensor sharing message to second wireless device 904 to inform second wireless device 904 about the detected object.

In particular, in certain aspects, at 908, first wireless device 902 may receive, from network entity 906, signaling configuring first wireless device 902 with one or more conditions. In other words, network entity 906 may select the one or more conditions for including, in at least one message, raw sensor data corresponding to a detected object and transmit, to first wireless device 902, signaling configuring first wireless device 902 with the selected condition(s). The various conditions which may be selected by network entity 906 are described in more detail below. In certain other aspects, first wireless device 902 may be pre-configured with the one or more conditions.

At 914, first wireless device determines if one or more of the (pre-)configured condition(s) are satisfied. When, at 914, first wireless device 914 determines that one or more of the condition(s) are satisfied, at 916, first wireless device 902 transmits at least one message comprising information regarding the detected object. The information includes both (1) an abstract representation of the detected object and (2)

at least one raw sensor data set of the one or more raw sensor data sets (e.g., received at 908). In other words, the at least one message may include (1) characteristics of the detected object and (2) at least one raw sensor data set of the one or more raw sensor data sets. At 918, second wireless device 904 and network entity 906 identifies the object at least based on the characteristics of the detected object and the raw sensor data.

Although FIG. 9 illustrates first wireless device 902 transmitting, at 916, the message to both second wireless device 904 and network entity 906, in certain other aspects, first wireless device 902 may transmit the message to only one of second wireless device 904 or network entity 906, or transmit the message to one or more of second wireless device 904, network entity 906, and/or other wireless devices, network entities, the cloud, etc. Accordingly, at 918, any wireless device which receives the message may identifying the object at least based on the characteristics of the detected object and the raw sensor data.

Further, although not illustrated in FIG. 9, in some cases, first wireless device 902 determines, at 914, that one or more of the configured condition(s) are not met. Accordingly, at 916, first wireless device 902 transmits at least one message comprising information regarding the detected object. The information includes only the characteristics of the detected object, without the raw sensor data. Transmitting only the characteristics of the detected object, without the raw sensor data, helps to save resources and bandwidth for situations where, at 914, first wireless device 902 does determine one or more conditions are met.

As mentioned, a wireless device may be configured, or pre-configured, with various conditions for including, in at least one message, ancillary data (e.g., raw sensor data) corresponding to a detected object.

For example, in certain aspects, the one or more conditions include whether a transmitting wireless device (e.g., a wireless device which detects an object and transmits a sensor sharing message regarding the detected object) receives signaling configuring the transmitting wireless device with the one or more conditions. In other words, where the transmitting wireless device receives signaling configuring the device with the one or more conditions, the transmitting wireless device may always include ancillary data corresponding to detected objects in sensor sharing messages (e.g., given the condition is satisfied based solely on receiving the signaling).

In certain aspects, the one or more conditions include whether noise in at least one of the one or more raw sensor data sets satisfies a threshold. In particular, in many sensors, noise is inevitable and a sensor's reading may be corrupted by such noise interference. Accordingly, where a transmitting wireless device receives a raw data set from a sensor at the transmitting wireless device (e.g., which may be used to detect and object) and noise in the sensor satisfies a threshold (e.g., excessive noise above a threshold amount of noise), the transmitting wireless device may include in at least one message, the raw sensor data corresponding to the detected object.

In certain aspects, the one or more conditions include a weather condition at a location of the first wireless device. In particular, certain weather may degrade sensor visibility of one or more sensors at a transmitting wireless device. For example, in a particular location where it is foggy, sensor visibility may be degraded. Accordingly, one or more raw data sets received, at the transmitting device for detecting an object, may not provide the most optimal quality of data for detecting an object. Thus, when informing a receiving ITS station about the detected object, the transmitting wireless device may include the raw sensor data to further aid the receiver in detecting the object. Accordingly, weather conditions in an area where the transmitting wireless device is situated may motivate sending such ancillary data. In aspects, certain localized weather conditions may motivate sending ancillary data on a regular basis in some regular geographic regions. For example, a city in Washington known to be particularly rainy (thereby consistently satisfying the one or more conditions related to weather), may motivate sending ancillary data on a regular basis while ITS stations are within this city.

In certain aspects, the one or more conditions include a confidence level that the object is detected based on processing the one or more raw sensor data sets satisfies a threshold. In other words, each sensor sharing message transmitted about a detected object may be sent with a confidence level associated with the detection. The confidence level may be determined by the transmitting wireless device and may indicate a percentage of confidence as to the accuracy of the detection. The accuracy of the detection may be affected by a number of factors, including a type of sensor used by transmitting wireless device to detect the object, a number of sensors used by the transmitting wireless device to detect the object, weather conditions when the raw sensor data was collected (e.g., raining, snowing, etc.), visibility (e.g., light) conditions when the raw sensor data was collected, occlusion, etc. Thus, a transmitting wireless device may be configured to (e.g., via the one or more conditions) transmit ancillary data associated with a detected object in a sensor sharing message when a confidence level of the accuracy of the detection is below a determined threshold.

In certain aspects, the one or more conditions are associated with one or more types of objects, and the one or more conditions are met when a type of the object matches the one or more types of objects. In other words, a transmitting wireless device may be configured to always include ancillary data associated with a detected object in a sensor sharing when the detected object is a particular object. For example, using FIG. 7, a network entity may configure V1 to always include raw sensor data in a sensor sharing message regarding an object, when the object is a pedestrian. Thus, in FIG. 7, in a case where V1 detects the pedestrian riding the bicycle based on processing raw data received from one or more sensors at V1, because the detected object is a pedestrian the condition may be satisfied, and V1 may include raw sensor data in its sensor sharing message to V2. On the other hand, where V1 detects V3 based on processing raw sensor data, a sensor sharing message to V2 regarding V3 may not include raw sensor data given V3 is a vehicle, as opposed to a pedestrian (e.g., the condition is not satisfied).

In certain aspects, the one or more conditions include whether a channel condition between a transmitting wireless device and a receiving wireless device satisfies a threshold. In other words, over-the-air resource congestion may be a factor to consider when determining whether to include ancillary data in a sensor sharing message. For example, in some cases, where a channel is congested (e.g., above a threshold), ancillary data may not be included, and where the channel is not congested (e.g., below a threshold), ancillary data may be included. In some cases, channel congestion may be dependent on a location of the transmitting and receiving wireless devices. For example, where the transmitting and receiving wireless devices are situated in a desert, such ancillary data may be included in sensor sharing messages between these devices because over-the-air congestion is likely lower (e.g., due to less ITS stations available for transmitting such messages). However, where the transmitting and receiving wireless devices are situated at an intersection in New York City, ancillary data may not be included in sensor sharing messages between these devices given over-the-air congestion is likely higher in this location (e.g., due a greater number of ITS stations which may be available for transmitting such messages).

In certain aspects, the one or more conditions are associated with one or more types of wireless devices. In some cases, the one or more conditions are met when a type of a transmitting wireless device matches the one or more types of wireless devices. For example, a network entity may configure wireless devices to transmit ancillary data only when the transmitting wireless device is a first responder wireless device (e.g., a fire truck, a police car, an ambulance, etc.). The network entity may configure wireless devices with such a condition to ensure there is available bandwidth and resources for a first responder to transmit their raw sensor data, which often includes information regarding safety-critical situations.

In some other cases, the one or more conditions are met when a type of the receiving wireless device matches the one or more types of wireless devices. In some other cases, the one or more conditions are met when a type of a transmitting wireless device and a type of the receiving wireless device match the one or more types of wireless devices.

In certain aspects, the one or more conditions are associated with one or more types of environments, and the one or more conditions are met when a location of a transmitting wireless device corresponds to at least one of the one or more types of environments. The specified environments may include a school zone, a construction zone, an intersection, an environment with narrow rods, or the like. For example, a network entity may configure wireless devices to transmit ancillary data when a location of a transmitting wireless device is in a school zone. The network entity may select this condition to improve the detection of young kids in the area to provide an extra level of safety precaution. Thus, when a transmitting wireless device is in a school zone, ancillary data may be sent in any sensor sharing message regarding any objected detected by the transmitting wireless device while in this school zone.

Example Operations of a User Equipment

Figure 10:
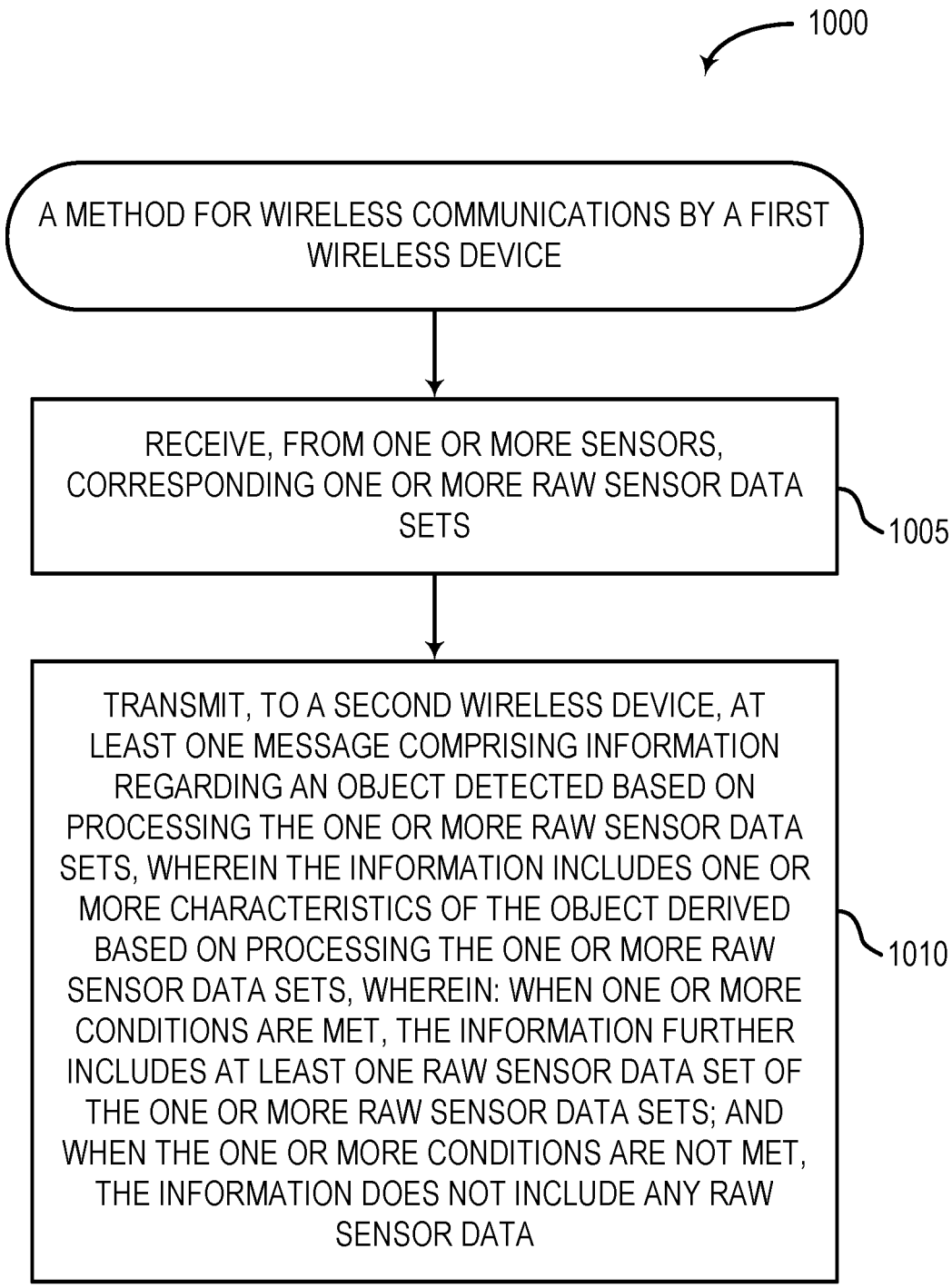
FIG. 10 depicts a method for wireless communications.

FIG. 10 shows an example of a method 1000 for wireless communications by a first wireless device, such as by a UE 104 of FIGS. 1 and 3.

Method 1000 begins at step 1005 with receiving, from one or more sensors, corresponding one or more raw sensor data sets. In some cases, the operations of this step refer to, or may be performed by, circuitry for receiving and/or code for receiving as described with reference to FIG. 13.

Method 1000 then proceeds to step 1010 with transmitting, to a second wireless device, at least one message comprising information regarding an object detected based on processing the one or more raw sensor data sets, wherein the information includes one or more characteristics of the object derived based on processing the one or more raw sensor data sets, wherein: when one or more conditions are met, the information further includes at least one raw sensor data set of the one or more raw sensor data sets; and when the one or more conditions are not met, the information does not include any raw sensor data. In some cases, the operations of this step refer to, or may be performed by, circuitry for transmitting and/or code for transmitting as described with reference to FIG. 13.

In some aspects, the method 1000 further includes receiving, from the second wireless device, a request for raw sensor data in response to a first message, wherein: the at least one message comprises the first message comprising the one or more characteristics; the at least one message comprises a second message comprising the at least one raw sensor data set; and the one or more conditions are met based on receiving the request. In some cases, the operations of this step refer to, or may be performed by, circuitry for receiving and/or code for receiving as described with reference to FIG. 13.

In some aspects, the request comprises at least one of: an indication of the object; or a type of raw sensor data requested, wherein the type of raw sensor data comprises at least one of image data, radar data, or lidar data.

In some aspects, the method 1000 further includes receiving, from a network entity, signaling configuring the first wireless device to transmit the at least one raw sensor data set, wherein the one or more conditions are met based on receiving the signaling. In some cases, the operations of this step refer to, or may be performed by, circuitry for receiving and/or code for receiving as described with reference to FIG. 13.

In some aspects, the method 1000 further includes receiving, from a network entity, signaling configuring the first wireless device with the one or more conditions. In some cases, the operations of this step refer to, or may be performed by, circuitry for receiving and/or code for receiving as described with reference to FIG. 13.

In some aspects, the one or more conditions comprise whether noise in at least one of the one or more raw sensor data sets satisfies a threshold.

In some aspects, the one or more conditions comprise a weather condition at a location of the first wireless device.

In some aspects, the one or more conditions comprise whether a confidence level that the object is detected based on processing the one or more raw sensor data sets satisfies a threshold.

In some aspects, the one or more conditions are associated with one or more types of objects; and the one or more conditions are met when a type of the object matches the one or more types of objects.

In some aspects, the one or more conditions comprise whether a channel condition between the first wireless device and the second wireless device satisfies a threshold.

In some aspects, the one or more conditions are associated with one or more types of wireless devices; and the one or more conditions are met when a type of the first wireless device matches the one or more types of wireless devices.

In some aspects, the one or more conditions are associated with one or more types of wireless devices; and the one or more conditions are met when a type of the second wireless device matches the one or more types of wireless devices.

In some aspects, the one or more conditions are associated with one or more types of environments; and the one or more conditions are met when a location of the first wireless device corresponds to at least one of the one or more types of environments.

In some aspects, the one or more types of environments comprise at least one of: a school zone; a construction zone; an intersection; or an environment with narrow roads.

In some aspects, the one or more characteristics comprise at least one of: a location of the object; a motion state of the object; or a type of the object.

In some aspects, the at least one message comprises: an application-layer message; a RRC message; a sidelink application layer message; or a sidelink signaling message.

Figure 13:
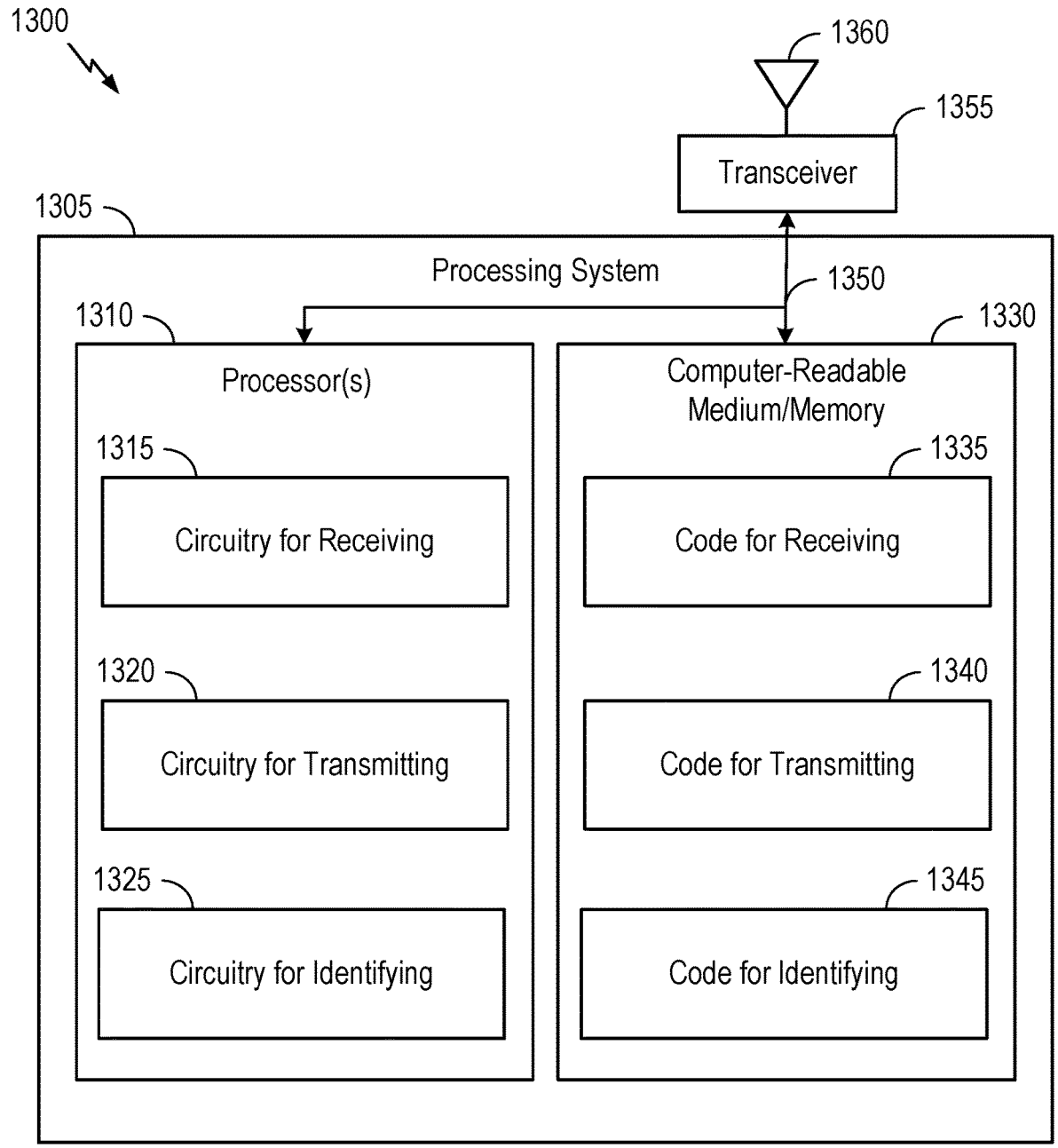
FIG. 13 depicts aspects of an example communications device.

In one aspect, method 1000, or any aspect related to it, may be performed by an apparatus, such as communications device 1300 of FIG. 13, which includes various components operable, configured, or adapted to perform the method 1000. Communications device 1300 is described below in further detail.

Note that FIG. 10 is just one example of a method, and other methods including fewer, additional, or alternative steps are possible consistent with this disclosure.

Figure 11:
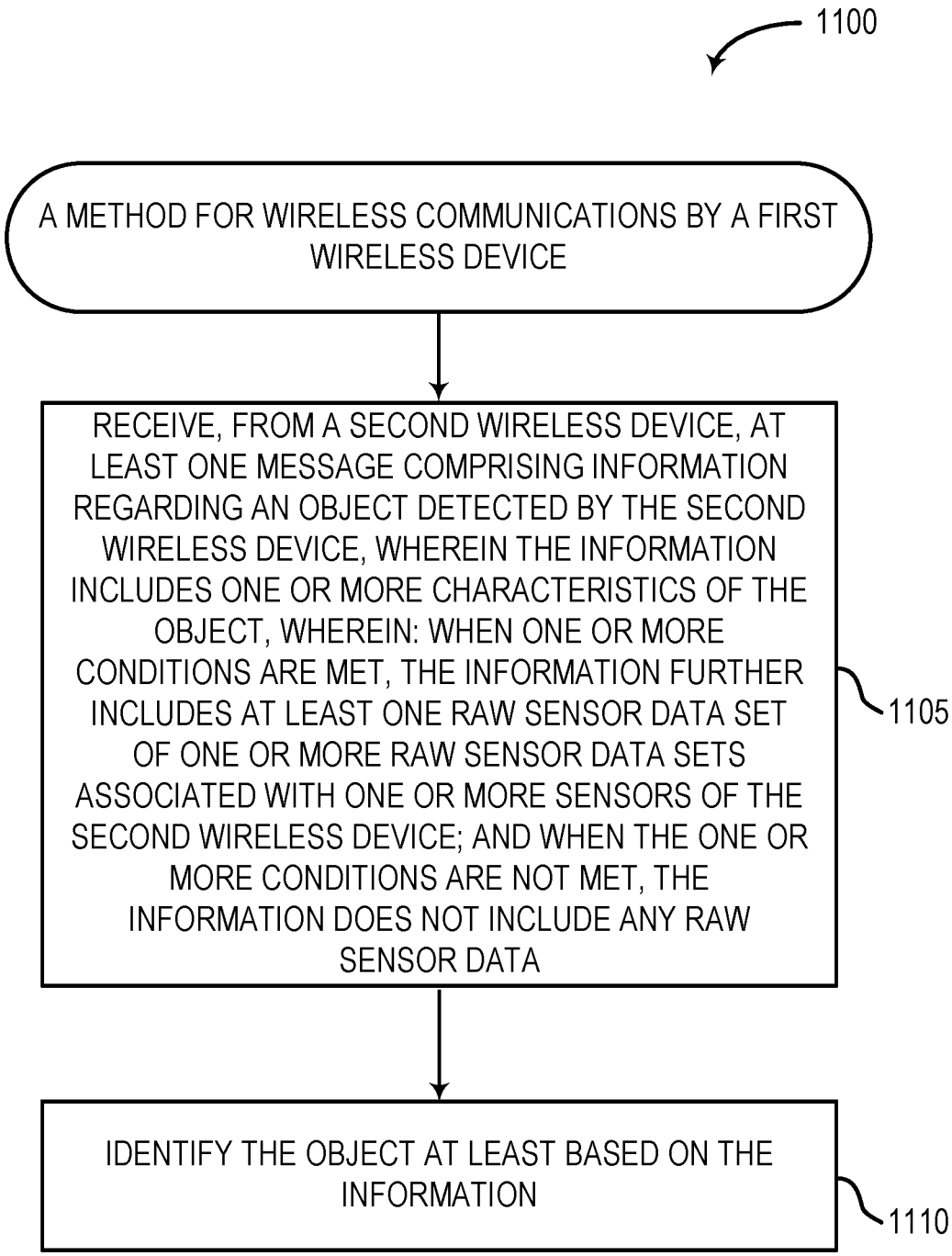
FIG. 11 depicts a method for wireless communications.

FIG. 11 shows an example of a method 1100 for wireless communications by a first wireless device, such as by a UE 104 of FIGS. 1 and 3.

Method 1100 begins at step 1105 with receiving, from a second wireless device, at least one message comprising information regarding an object detected by the second wireless device, wherein the information includes one or more characteristics of the object, wherein: when one or more conditions are met, the information further includes at least one raw sensor data set of one or more raw sensor data sets associated with one or more sensors of the second wireless device; and when the one or more conditions are not met, the information does not include any raw sensor data. In some cases, the operations of this step refer to, or may be performed by, circuitry for receiving and/or code for receiving as described with reference to FIG. 13.

Method 1100 then proceeds to step 1110 with identifying the object at least based on the information. In some cases, the operations of this step refer to, or may be performed by, circuitry for identifying and/or code for identifying as described with reference to FIG. 13.

In some aspects, the method 1100 further includes transmitting, to the second wireless device, a request for raw sensor data in response to a first message, wherein: the at least one message comprises the first message comprising the one or more characteristics; the at least one message comprises a second message comprising the at least one raw sensor data set; and the one or more conditions are met based on transmitting the request. In some cases, the operations of this step refer to, or may be performed by, circuitry for transmitting, and/or code for transmitting, as described with reference to FIG. 13.

In some aspects, the request comprises at least one of: an indication of the object; or a type of raw sensor data requested, wherein the type of raw sensor data comprises at least one of image data, radar data, or lidar data.

In some aspects, the one or more conditions comprise whether noise in at least one of the one or more raw sensor data sets satisfies a threshold.

In some aspects, the one or more conditions comprise a weather condition at a location of the second wireless device.

In some aspects, the one or more conditions comprise whether a confidence level that the object is detected satisfies a threshold.

In some aspects, the one or more conditions are associated with one or more types of objects; and the one or more conditions are met when a type of the object matches the one or more types of objects.

In some aspects, the one or more conditions comprise whether a channel condition between the first wireless device and the second wireless device satisfies a threshold.

In some aspects, the one or more conditions are associated with one or more types of wireless devices; and the one or more conditions are met when a type of the second wireless device matches the one or more types of wireless devices.

In some aspects, the one or more conditions are associated with one or more types of wireless devices; and the one or more conditions are met when a type of the first wireless device matches the one or more types of wireless devices.

In some aspects, the one or more conditions are associated with one or more types of environments; and the one or more conditions are met when a location of the second wireless device corresponds to at least one of the one or more types of environments.

In some aspects, the one or more types of environments comprise at least one of: a school zone; a construction zone; an intersection; or an environment with narrow roads.

In some aspects, the one or more characteristics comprise at least one of: a location of the object; a motion state of the object; or a type of the object.

In some aspects, the at least one message comprises: an application-layer message; a RRC message; a sidelink application layer message; or a sidelink signaling message.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Example Operations of a Network Entity

Figure 12:
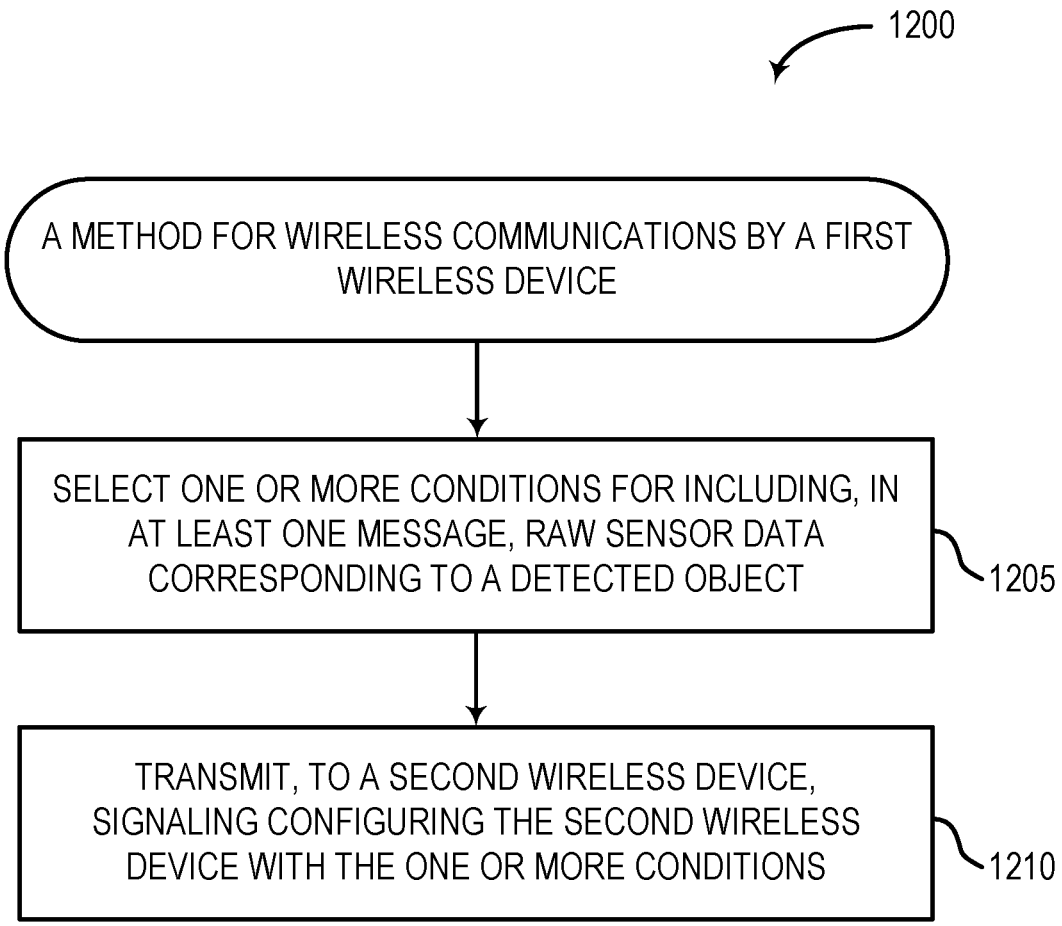
FIG. 12 depicts a method for wireless communications.

FIG. 12 shows an example of a method 1200 for wireless communications by a first wireless device, such as by a BS 102 of FIGS. 1 and 3, or a disaggregated base station as discussed with respect to FIG. 2.

Method 1200 begins at step 1205 with selecting one or more conditions for including, in at least one message, raw sensor data corresponding to a detected object. In some cases, the operations of this step refer to, or may be performed by, circuitry for selecting and/or code for selecting as described with reference to FIG. 14.

Method 1200 then proceeds to step 1210 with transmitting, to a second wireless device, signaling configuring the second wireless device with the one or more conditions. In some cases, the operations of this step refer to, or may be performed by, circuitry for transmitting and/or code for transmitting as described with reference to FIG. 14.

In some aspects, the first wireless device comprises a network entity.

In some aspects, the one or more conditions comprise whether the signaling was received by the second wireless device.

In some aspects, the one or more conditions comprise whether noise in the raw sensor data satisfies a threshold.

In some aspects, the one or more conditions comprise a weather condition at a location of the second wireless device.

In some aspects, the one or more conditions comprise whether a confidence level that the detected object is detected satisfies a threshold.

In some aspects, the one or more conditions are associated with one or more types of objects; and the one or more conditions are met when a type of the detected object matches the one or more types of objects.

In some aspects, the one or more conditions comprise whether a channel condition satisfies a threshold.

In some aspects, the one or more conditions are associated with one or more types of wireless devices; and the one or more conditions are met when a type of the second wireless device matches the one or more types of wireless devices.

In some aspects, the one or more conditions are associated with one or more types of wireless devices; and the one or more conditions are met when a type of a wireless device intended for receiving the at least one message matches the one or more types of wireless devices.

In some aspects, the one or more conditions are associated with one or more types of environments; and the one or more conditions are met when a location of the second wireless device corresponds to at least one of the one or more types of environments.

In some aspects, the one or more types of environments comprise at least one of: a school zone; a construction zone; an intersection; or an environment with narrow roads.

Figure 14:
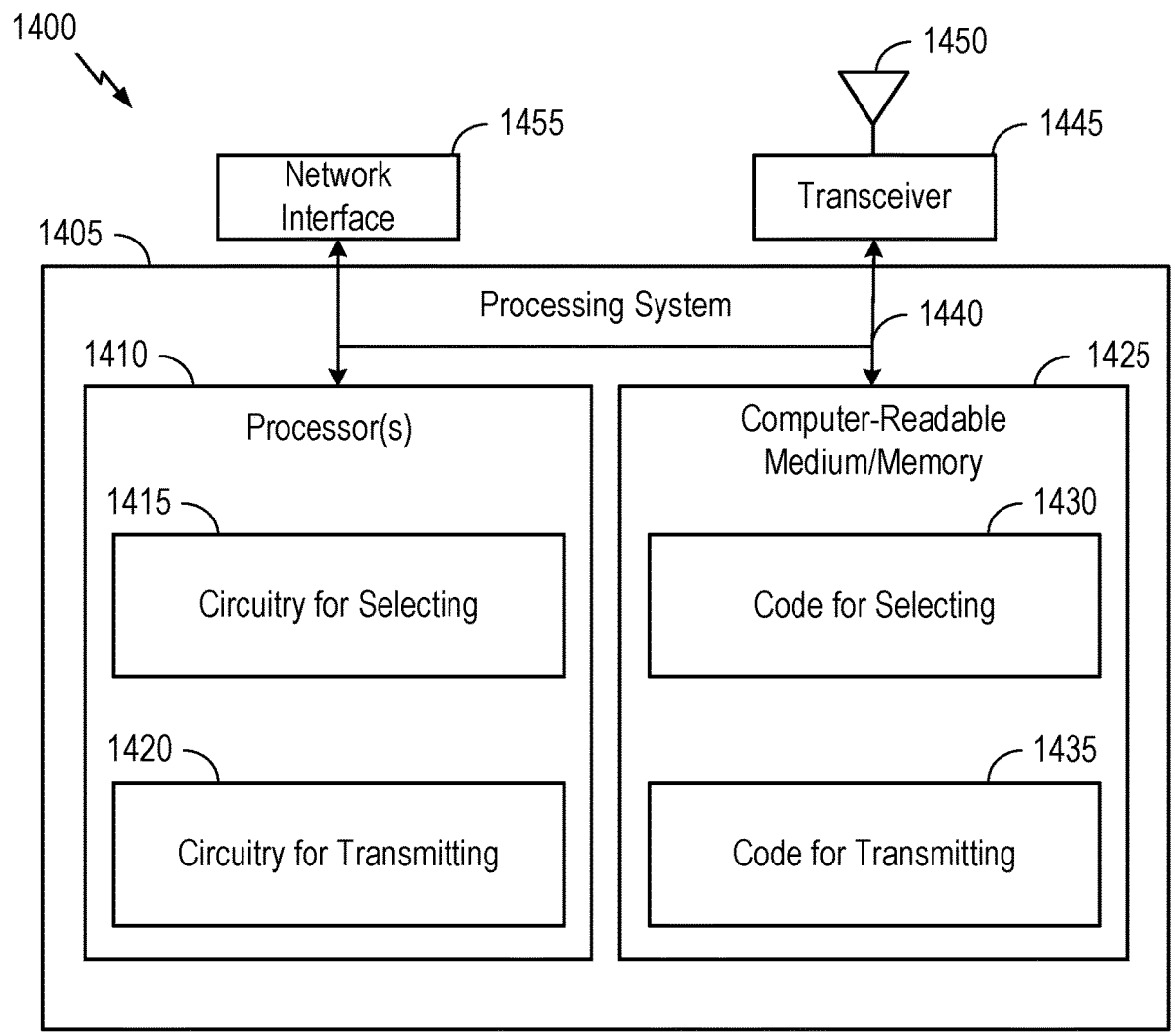
FIG. 14 depicts aspects of an example communications device.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Example Communications Devices

FIG. 13 depicts aspects of an example communications device 1300. In some aspects, communications device 1300 is a user equipment, such as UE 104 described above with respect to FIGS. 1 and 3.

The communications device 1300 includes a processing system 1305 coupled to the transceiver 1355 (e.g., a transmitter and/or a receiver). The transceiver 1355 is configured to transmit and receive signals for the communications device 1300 via the antenna 1360, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. The one or more processors 1310 are coupled to a computer-readable medium/memory 1330 via a bus 1350. In certain aspects, the computer-readable medium/memory 1330 is configured to store instructions (e.g., computer-executable code) that when executed by the one or more processors 1310, cause the one or more processors 1310 to perform the method 1000 described with respect to FIG. 10, or any aspect related to it. In certain aspects, the computer-readable medium/memory 1330 is configured to store instructions (e.g., computer-executable code) that when executed by the one or more processors 1310, cause the one or more processors 1310 to perform the method 1100 described with respect to FIG. 11, or any aspect related to it. Note that reference to a processor performing a function of communications device 1300 may include one or more processors 1310 performing that function of communications device 1300.

In the depicted example, computer-readable medium/memory 1330 stores code (e.g., executable instructions), such as code for receiving 1335, code for transmitting 1340, and code for identifying 1345. In some aspects, processing of the code for receiving 1335, code for transmitting 1340, and code for identifying 1345 may cause the communications device 1300 to perform the method 1000 described with respect to FIG. 10, or any aspect related to it. In some aspects, processing of the code for receiving 1335, code for transmitting 1340, and code for identifying 1345 may cause the communications device 1300 to perform the method 1100 described with respect to FIG. 11, or any aspect related to it.

The one or more processors 1310 include circuitry configured to implement (e.g., execute) the code stored in the computer-readable medium/memory 1330, including circuitry such as circuitry for receiving 1315, circuitry for transmitting 1320, and circuitry for identifying 1325. In some aspects, processing with circuitry for receiving 1315, circuitry for transmitting 1320, and circuitry for identifying 1325 may cause the communications device 1300 to perform the method 1000 described with respect to FIG. 10, or any aspect related to it. In some aspects, processing with circuitry for receiving 1315, circuitry for transmitting 1320, and circuitry for identifying 1325 may cause the communications device 1300 to perform the method 1100 described with respect to FIG. 11, or any aspect related to it.

Various components of the communications device 1300 may provide means for performing the method 1000 described with respect to FIG. 10, or any aspect related to it, and/or the method 1100 described with respect to FIG. 11, or any aspect related to it. For example, means for transmitting, sending or outputting for transmission may include transceivers 354 and/or antenna(s) 352 of the UE 104 illustrated in FIG. 3 and/or the transceiver 1355 and the antenna 1360 of the communications device 1300 in FIG. 13. Means for receiving or obtaining may include transceivers 354 and/or antenna(s) 352 of the UE 104 illustrated in FIG. 3 and/or the transceiver 1355 and the antenna 1360 of the communications device 1300 in FIG. 13.

FIG. 14 depicts aspects of an example communications device 1400. In some aspects, communications device 1400 is a network entity, such as BS 102 of FIGS. 1 and 3, or a disaggregated base station as discussed with respect to FIG. 2.

The communications device 1400 includes a processing system 1405 coupled to the transceiver 1445 (e.g., a transmitter and/or a receiver) and/or a network interface 1455. The transceiver 1445 is configured to transmit and receive signals for the communications device 1400 via the antenna 1450, such as the various signals as described herein. The network interface 1455 is configured to obtain and send signals for the communications device 1400 via communication link(s), such as a backhaul link, midhaul link, and/or fronthaul link as described herein, such as with respect to FIG. 2. The processing system 1405 may be configured to perform processing functions for the communications device 1400, including processing signals received and/or to be transmitted by the communications device 1400.

The processing system 1405 includes one or more processors 1410. In various aspects, one or more processors 1410 may be representative of one or more of receive processor 338, transmit processor 320, TX MIMO processor 330, and/or controller/processor 340, as described with respect to FIG. 3. The one or more processors 1410 are coupled to a computer-readable medium/memory 1425 via a bus 1440. In certain aspects, the computer-readable medium/memory 1425 is configured to store instructions (e.g., computer-executable code) that when executed by the one or more processors 1410, cause the one or more processors 1410 to perform the method 1200 described with respect to FIG. 12, or any aspect related to it. Note that reference to a processor of communications device 1400 performing a function may include one or more processors 1410 of communications device 1400 performing that function.

In the depicted example, the computer-readable medium/memory 1425 stores code (e.g., executable instructions), such as code for selecting 1430 and code for transmitting 1435. Processing of the code for selecting 1430 and code for transmitting 1435 may cause the communications device 1400 to perform the method 1200 described with respect to FIG. 12, or any aspect related to it.

The one or more processors 1410 include circuitry configured to implement (e.g., execute) the code stored in the computer-readable medium/memory 1425, including circuitry such as circuitry for selecting 1415 and circuitry for transmitting 1420. Processing with circuitry for selecting 1415 and circuitry for transmitting 1420 may cause the communications device 1400 to perform the method 1200 as described with respect to FIG. 12, or any aspect related to it.

Various components of the communications device 1400 may provide means for performing the method 1200 as described with respect to FIG. 12, or any aspect related to it. Means for transmitting, sending or outputting for transmission may include transceivers 332 and/or antenna(s) 334 of the BS 102 illustrated in FIG. 3 and/or the transceiver 1445 and the antenna 1450 of the communications device 1400 in FIG. 14. Means for receiving or obtaining may include transceivers 332 and/or antenna(s) 334 of the BS 102 illustrated in FIG. 3 and/or the transceiver 1445 and the antenna 1450 of the communications device 1400 in FIG. 14.

Example Clauses

Implementation examples are described in the following numbered clauses:

Clause 1: A method for wireless communications by a first wireless device, the method comprising: receiving, from one or more sensors, corresponding one or more raw sensor data sets; and transmitting, to a second wireless device, at least one message comprising information regarding an object detected based on processing the one or more raw sensor data sets, wherein the information includes one or more characteristics of the object derived based on processing the one or more raw sensor data sets, wherein: when one or more conditions are met, the information further includes at least one raw sensor data set of the one or more raw sensor data sets; and when the one or more conditions are not met, the information does not include any raw sensor data.

Clause 2: The method of Clause 1, further comprising: receiving, from the second wireless device, a request for raw sensor data in response to a first message, wherein: the at least one message comprises the first message comprising the one or more characteristics; the at least one message comprises a second message comprising the at least one raw sensor data set; and the one or more conditions are met based on receiving the request.

Clause 3: The method of Clause 2, wherein the request comprises at least one of: an indication of the object; or a type of raw sensor data requested, wherein the type of raw sensor data comprises at least one of image data, radar data, or lidar data.

Clause 4: The method of any one of Clauses 1-3, further comprising: receiving, from a network entity, signaling configuring the first wireless device to transmit the at least one raw sensor data set, wherein the one or more conditions are met based on receiving the signaling.

Clause 5: The method of any one of Clauses 1-4, further comprising: receiving, from a network entity, signaling configuring the first wireless device with the one or more conditions.

Clause 6: The method of any one of Clauses 1-5, wherein: the one or more conditions comprise whether noise in at least one of the one or more raw sensor data sets satisfies a threshold.

Clause 7: The method of any one of Clauses 1-6, wherein: the one or more conditions comprise a weather condition at a location of the first wireless device.

Clause 8: The method of any one of Clauses 1-7, wherein: the one or more conditions comprise whether a confidence level that the object is detected based on processing the one or more raw sensor data sets satisfies a threshold.

Clause 9: The method of any one of Clauses 1-8, wherein: the one or more conditions are associated with one or more types of objects; and the one or more conditions are met when a type of the object matches the one or more types of objects.

Clause 10: The method of any one of Clauses 1-9, wherein: the one or more conditions comprise whether a channel condition between the first wireless device and the second wireless device satisfies a threshold.

Clause 11: The method of any one of Clauses 1-10, wherein: the one or more conditions are associated with one or more types of wireless devices; and the one or more conditions are met when a type of the first wireless device matches the one or more types of wireless devices.

Clause 12: The method of any one of Clauses 1-11, wherein: the one or more conditions are associated with one or more types of wireless devices; and the one or more conditions are met when a type of the second wireless device matches the one or more types of wireless devices.

Clause 13: The method of any one of Clauses 1-12, wherein: the one or more conditions are associated with one or more types of environments; and the one or more conditions are met when a location of the first wireless device corresponds to at least one of the one or more types of environments.

Clause 14: The method of Clause 13, wherein the one or more types of environments comprise at least one of: a school zone; a construction zone; an intersection; or an environment with narrow roads.

Clause 15: The method of any one of Clauses 1-14, wherein the one or more characteristics comprise at least one of: a location of the object; a motion state of the object; or a type of the object.

Clause 16: The method of any one of Clauses 1-15, wherein the at least one message comprises: an application-layer message; a RRC message; a sidelink application layer message; or a sidelink signaling message.

Clause 17: A method for wireless communications by a first wireless device, the method comprising: receiving, from a second wireless device, at least one message comprising information regarding an object detected by the second wireless device, wherein the information includes one or more characteristics of the object, wherein: when one or more conditions are met, the information further includes at least one raw sensor data set of one or more raw sensor data sets associated with one or more sensors of the second wireless device; and when the one or more conditions are not met, the information does not include any raw sensor data; and identifying the object at least based on the information.

Clause 18: The method of Clause 17, further comprising: transmitting, to the second wireless device, a request for raw sensor data in response to a first message, wherein: the at least one message comprises the first message comprising the one or more characteristics; the at least one message comprises a second message comprising the at least one raw sensor data set; and the one or more conditions are met based on transmitting the request.

Clause 19: The method of Clause 18, wherein the request comprises at least one of: an indication of the object; or a type of raw sensor data requested, wherein the type of raw sensor data comprises at least one of image data, radar data, or lidar data.

Clause 20: The method of any one of Clauses 17-19, wherein: the one or more conditions comprise whether noise in at least one of the one or more raw sensor data sets satisfies a threshold.

Clause 21: The method of any one of Clauses 17-20, wherein: the one or more conditions comprise a weather condition at a location of the second wireless device.

Clause 22: The method of any one of Clauses 17-21, wherein: the one or more conditions comprise whether a confidence level that the object is detected satisfies a threshold.

Clause 23: The method of any one of Clauses 17-22, wherein: the one or more conditions are associated with one or more types of objects; and the one or more conditions are met when a type of the object matches the one or more types of objects.

Clause 24: The method of any one of Clauses 17-23, wherein: the one or more conditions comprise whether a channel condition between the first wireless device and the second wireless device satisfies a threshold.

Clause 25: The method of any one of Clauses 17-24, wherein: the one or more conditions are associated with one or more types of wireless devices; and the one or more conditions are met when a type of the second wireless device matches the one or more types of wireless devices.

Clause 26: The method of any one of Clauses 17-25, wherein: the one or more conditions are associated with one or more types of wireless devices; and the one or more conditions are met when a type of the first wireless device matches the one or more types of wireless devices.

Clause 27: The method of any one of Clauses 17-26, wherein: the one or more conditions are associated with one or more types of environments; and the one or more conditions are met when a location of the second wireless device corresponds to at least one of the one or more types of environments.

Clause 28: The method of Clause 27, wherein the one or more types of environments comprise at least one of: a school zone; a construction zone; an intersection; or an environment with narrow roads.

Clause 29: The method of any one of Clauses 17-28, wherein the one or more characteristics comprise at least one of: a location of the object; a motion state of the object; or a type of the object.

Clause 30: The method of any one of Clauses 17-29, wherein the at least one message comprises: an application-layer message; a RRC message; a sidelink application layer message; or a sidelink signaling message.

Clause 31: A method for wireless communications by a first wireless device, the method comprising: selecting one or more conditions for including, in at least one message, raw sensor data corresponding to a detected object and transmitting, to a second wireless device, signaling configuring the second wireless device with the one or more conditions.

Clause 32: The method of Clause 31, wherein the first wireless device comprises a network entity.

Clause 33: The method of any one of Clauses 31 and 32, wherein: the one or more conditions comprise whether the signaling was received by the second wireless device.

Clause 34: The method of any one of Clauses 31-33, wherein: the one or more conditions comprise whether noise in the raw sensor data satisfies a threshold.

Clause 35: The method of any one of Clauses 31-34, wherein: the one or more conditions comprise a weather condition at a location of the second wireless device.

Clause 36: The method of any one of Clauses 31-35, wherein: the one or more conditions comprise whether a confidence level that the detected object is detected satisfies a threshold.

Clause 37: The method of any one of Clauses 31-36, wherein: the one or more conditions are associated with one or more types of objects; and the one or more conditions are met when a type of the detected object matches the one or more types of objects.

Clause 38: The method of any one of Clauses 31-37, wherein: the one or more conditions comprise whether a channel condition satisfies a threshold.

Clause 39: The method of any one of Clauses 31-38, wherein: the one or more conditions are associated with one or more types of wireless devices; and the one or more conditions are met when a type of the second wireless device matches the one or more types of wireless devices.

Clause 40: The method of any one of Clauses 31-39, wherein: the one or more conditions are associated with one or more types of wireless devices; and the one or more conditions are met when a type of a wireless device intended for receiving the at least one message matches the one or more types of wireless devices.

Clause 41: The method of any one of Clauses 31-40, wherein: the one or more conditions are associated with one or more types of environments; and the one or more conditions are met when a location of the second wireless device corresponds to at least one of the one or more types of environments.

Clause 42: The method of Clause 41, wherein the one or more types of environments comprise at least one of: a school zone; a construction zone; an intersection; or an environment with narrow roads.

Clause 43: An apparatus, comprising: a memory comprising executable instructions; and a processor configured to execute the executable instructions and cause the apparatus to perform a method in accordance with any one of Clauses 1-42.

Clause 44: An apparatus, comprising means for performing a method in accordance with any one of Clauses 1-42.

Clause 45: A non-transitory computer-readable medium comprising executable instructions that, when executed by a processor of an apparatus, cause the apparatus to perform a method in accordance with any one of Clauses 1-42.

Clause 46: A computer program product embodied on a computer-readable storage medium comprising code for performing a method in accordance with any one of Clauses 1-42.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a first wireless device, the method comprising:
   receiving, from one or more sensors, corresponding one or more raw sensor data sets;
   receiving, from a second wireless device, a request for raw sensor data in response to a first message; and
   transmitting, to the second wireless device, at least one message comprising information regarding an object detected based on processing the one or more raw sensor data sets, wherein the information includes one or more characteristics of the object derived based on processing the one or more raw sensor data sets, wherein:
   the at least one message comprises the first message comprising the one or more characteristics;
   the at least one message comprises a second message comprising at least one raw sensor data set of the one or more raw sensor data sets; and
   one or more conditions are met based on receiving the request and the information further includes the at least one raw sensor data set.

2. The method of claim 1, wherein the request comprises at least one of:
   an indication of the object; or
   a type of raw sensor data requested, wherein the type of raw sensor data comprises at least one of image data, radar data, or lidar data.

3. A method for wireless communications by a first wireless device, the method comprising:
   receiving, from one or more sensors, corresponding one or more raw sensor data sets;
   receiving, from a network entity, signaling configuring the first wireless device to transmit at least one raw sensor data set of the one or more raw sensor data sets; and
   transmitting, to a second wireless device, at least one message comprising information regarding an object detected based on processing the one or more raw sensor data sets, wherein the information includes one or more characteristics of the object derived based on processing the one or more raw sensor data sets, wherein:
   when one or more conditions are met based on receiving the signaling, the information further includes the at least one raw sensor data set; and
   when the one or more conditions are not met, the information does not include any raw sensor data.

4. The method of claim 1, further comprising:
   receiving, from a network entity, signaling configuring the first wireless device with the one or more conditions.

5. The method of claim 1, wherein:
the one or more conditions comprise whether noise in at least one of the one or more raw sensor data sets satisfies a threshold.

6. The method of claim 1, wherein:
the one or more conditions comprise a weather condition at a location of the first wireless device.

7. The method of claim 1, wherein:
the one or more conditions comprise whether a confidence level that the object is detected based on processing the one or more raw sensor data sets satisfies a threshold.

8. A method for wireless communications by a first wireless device, the method comprising:
receiving, from one or more sensors, corresponding one or more raw sensor data sets; and
transmitting, to a second wireless device, at least one message comprising information regarding an object detected based on processing the one or more raw sensor data sets, wherein the information includes one or more characteristics of the object derived based on processing the one or more raw sensor data sets, wherein:
one or more conditions are associated with one or more types of objects;
the one or more conditions are met when a type of the object matches the one or more types of objects;
when the one or more conditions are not met, the information further includes at least one raw sensor data set of the one or more raw sensor data sets; and
when the one or more conditions are not met, the information does not include any raw sensor data.

9. The method of claim 1, wherein:
the one or more conditions comprise whether a channel condition between the first wireless device and the second wireless device satisfies a threshold.

10. The method of claim 1, wherein:
the one or more conditions are associated with one or more types of wireless devices; and
the one or more conditions are met when a type of the first wireless device matches the one or more types of wireless devices.

11. A method for wireless communications by a first wireless device, the method comprising:
receiving, from one or more sensors, corresponding one or more raw sensor data sets; and
transmitting, to a second wireless device, at least one message comprising information regarding an object detected based on processing the one or more raw sensor data sets, wherein the information includes one or more characteristics of the object derived based on processing the one or more raw sensor data sets, wherein:
one or more conditions are associated with one or more types of wireless devices;
the one or more conditions are met when a type of the second wireless device matches the one or more types of wireless devices;
when the one or more conditions are met, the information further includes at least one raw sensor data set of the one or more raw sensor data sets; and
when the one or more conditions are not met, the information does not include any raw sensor data.

12. The method of claim 1, wherein:
the one or more conditions are associated with one or more types of environments; and
the one or more conditions are met when a location of the first wireless device corresponds to at least one of the one or more types of environments.

13. The method of claim 12, wherein the one or more types of environments comprise at least one of:
a school zone;
a construction zone;
an intersection; or
an environment with narrow roads.

14. The method of claim 1, wherein the one or more characteristics comprise at least one of:
a location of the object;
a motion state of the object; or
a type of the object.

15. The method of claim 1, wherein the at least one message comprises:
an application-layer message;
a radio resource control (RRC) message;
a sidelink application layer message; or
a sidelink signaling message.

16. A method for wireless communications by a first wireless device, the method comprising:
transmitting, to a second wireless device, a request for raw sensor data in response to a first message; and
receiving, from the second wireless device, at least one message comprising information regarding an object detected by the second wireless device, wherein the information includes one or more characteristics of the object, wherein:
the at least one message comprises the first message comprising the one or more characteristics;
the at least one message comprises a second message comprising at least one raw sensor data set of one or more raw sensor data sets associated with one or more sensors of the second wireless device; and
one or more conditions are met based on transmitting the request and the information further includes the at least one raw sensor data; and
identifying the object at least based on the information.

17. The method of claim 16, wherein the request comprises at least one of:
an indication of the object; or
a type of raw sensor data requested, wherein the type of raw sensor data comprises at least one of image data, radar data, or lidar data.

18. The method of claim 16, wherein:
the one or more conditions comprise whether noise in at least one of the one or more raw sensor data sets satisfies a threshold.

19. The method of claim 16, wherein:
the one or more conditions comprise a weather condition at a location of the second wireless device.

20. The method of claim 16, wherein:
the one or more conditions comprise whether a confidence level that the object is detected satisfies a threshold.

21. A method for wireless communications by a first wireless device, the method comprising:
receiving, from a second wireless device, at least one message comprising information regarding an object detected by the second wireless device, wherein the information includes one or more characteristics of the object, wherein:
one or more conditions are associated with one or more types of objects;
the one or more conditions are met when a type of the object matches the one or more types of objects;

when the one or more conditions are met, the information further includes at least one raw sensor data set of one or more raw sensor data sets associated with one or more sensors of the second wireless device; and when the one or more conditions are not met, the information does not include any raw sensor data; and identifying the object at least based on the information.

22. The method of claim 16, wherein:

the one or more conditions comprise whether a channel condition between the first wireless device and the second wireless device satisfies a threshold.

23. The method of claim 16, wherein:

the one or more conditions are associated with one or more types of wireless devices; and the one or more conditions are met when a type of the second wireless device matches the one or more types of wireless devices.

24. A method for wireless communications by a first wireless device, the method comprising:

receiving, from a second wireless device, at least one message comprising information regarding an object detected by the second wireless device, wherein the information includes one or more characteristics of the object, wherein:

one or more conditions are associated with one or more types of wireless devices;

the one or more conditions are met when a type of the first wireless device matches the one or more types of wireless devices;

when the one or more conditions are met, the information further includes at least one raw sensor data set of one or more raw sensor data sets associated with one or more sensors of the second wireless device; and when the one or more conditions are not met, the information does not include any raw sensor data; and identifying the object at least based on the information.

25. The method of claim 16, wherein:

the one or more conditions are associated with one or more types of environments; and the one or more conditions are met when a location of the second wireless device corresponds to at least one of the one or more types of environments.

26. A first wireless device configured for wireless communications, comprising:

memory comprising computer-executable instructions; and one or more processors configured to execute the computer-executable instructions and, individually or collectively, cause the first wireless device to:

receive, from one or more sensors, corresponding one or more raw sensor data sets;

receive, from a second wireless device, a request for raw sensor data in response to a first message; and transmit, to the second wireless device, at least one message comprising information regarding an object detected based on processing the one or more raw sensor data sets, wherein the information includes one or more characteristics of the object derived based on processing the one or more raw sensor data sets, wherein:

the at least one message comprises the first message comprising the one or more characteristics;

the at least one message comprises a second message comprising at least one raw sensor data set of the one or more raw sensor data sets; and one or more conditions are met based on receiving the request and the information further includes the at least one raw sensor data set.

* * * * *